(12) United States Patent
Worrell et al.

(10) Patent No.: US 8,046,505 B2
(45) Date of Patent: Oct. 25, 2011

(54) SYSTEMS FOR IMPLEMENTING SDRAM CONTROLLERS, AND BUSES ADAPTED TO INCLUDE ADVANCED HIGH PERFORMANCE BUS FEATURES

(75) Inventors: Frank Worrell, San Jose, CA (US); Keith D. Au, Woodland Hills, CA (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 12/869,889

(22) Filed: Aug. 27, 2010

(65) Prior Publication Data

US 2010/0325319 A1 Dec. 23, 2010

Related U.S. Application Data

(62) Division of application No. 11/520,219, filed on Sep. 13, 2006, now Pat. No. 7,797,467.

(60) Provisional application No. 60/732,684, filed on Nov. 1, 2005, provisional application No. 60/736,012, filed on Nov. 9, 2005.

(51) Int. Cl.
*G06F 13/28* (2006.01)
(52) U.S. Cl. ............... 710/35; 710/32; 710/36
(58) Field of Classification Search ............ None
See application file for complete search history.

(56) References Cited

U.S. PATENT DOCUMENTS

| | | | |
|---|---|---|---|
| 4,586,128 A | 4/1986 | DeWoskin | 710/113 |
| 5,091,940 A * | 2/1992 | Clebowicz | 380/37 |
| 5,485,589 A * | 1/1996 | Kocis et al. | 711/213 |
| 5,652,847 A * | 7/1997 | Padwekar | 710/305 |
| 5,740,376 A * | 4/1998 | Carson et al. | 710/35 |
| 5,768,560 A * | 6/1998 | Lieberman et al. | 711/167 |
| 5,784,582 A * | 7/1998 | Hughes | 710/117 |
| 5,838,950 A * | 11/1998 | Young et al. | 703/21 |
| 5,864,512 A * | 1/1999 | Buckelew et al. | 365/230.01 |
| 5,915,104 A * | 6/1999 | Miller | 710/310 |
| 5,918,072 A * | 6/1999 | Bhattacharya | 710/35 |
| 6,006,303 A | 12/1999 | Barnaby et al. | 710/244 |
| 6,115,767 A * | 9/2000 | Hashimoto et al. | 710/107 |
| 6,161,165 A * | 12/2000 | Solomon et al. | 711/114 |
| 6,185,637 B1 * | 2/2001 | Strongin et al. | 710/35 |
| 6,269,413 B1 | 7/2001 | Sherlock | 710/52 |
| 6,412,048 B1 * | 6/2002 | Chauvel et al. | 711/158 |
| 6,418,077 B1 * | 7/2002 | Naven | 365/233.16 |
| 6,463,488 B1 | 10/2002 | San Juan | 710/107 |
| 6,477,082 B2 * | 11/2002 | Pekny et al. | 365/185.11 |

(Continued)

FOREIGN PATENT DOCUMENTS

JP 05225122 A * 9/1993

OTHER PUBLICATIONS

AMBA, AMBA Specification, 1999, ARM, pp. 1-230.

*Primary Examiner* — Cheng-Yuan Tseng
(74) *Attorney, Agent, or Firm* — Christopher P. Maiorana, PC

(57) ABSTRACT

A memory controller including an address incrementer and a page crossing detect logic. The address incrementer may be configured to generate a next address in a burst from a current address in the burst. The page crossing detect logic may be configured to determine whether the burst will cross a memory page boundary based on the current address and the next address. The memory controller may be configured to automatically split bursts crossing page boundaries.

20 Claims, 16 Drawing Sheets

U.S. PATENT DOCUMENTS

| | | | |
|---|---|---|---|
| 6,556,506 B2 * | 4/2003 | Naven | 365/230.03 |
| 6,633,926 B1 * | 10/2003 | Harada et al. | 710/22 |
| 6,665,749 B1 * | 12/2003 | Ansari | 710/29 |
| 6,693,814 B2 | 2/2004 | McKenzie et al. | 365/49.18 |
| 6,701,422 B2 * | 3/2004 | Bao | 711/201 |
| 6,799,304 B2 | 9/2004 | Hammitt et al. | 716/1 |
| 6,813,701 B1 * | 11/2004 | Ansari | 712/4 |
| 6,831,587 B1 | 12/2004 | Joshi | 341/160 |
| 6,876,941 B2 * | 4/2005 | Nightingale | 702/120 |
| 6,904,473 B1 * | 6/2005 | Bloxham et al. | 710/22 |
| 6,907,491 B2 | 6/2005 | Moss | 710/309 |
| 6,981,088 B2 * | 12/2005 | Holm et al. | 710/306 |
| 6,985,985 B2 | 1/2006 | Moss | 710/240 |
| 7,061,267 B2 * | 6/2006 | Campbell et al. | 326/38 |
| 7,155,582 B2 * | 12/2006 | Ross | 711/158 |
| 7,281,079 B2 * | 10/2007 | Bains et al. | 711/5 |
| 7,310,722 B2 | 12/2007 | Moy et al. | 712/207 |
| 7,373,437 B2 * | 5/2008 | Seigneret et al. | 710/22 |
| 7,546,391 B2 | 6/2009 | Castille et al. | 710/22 |
| 7,761,617 B2 * | 7/2010 | Seigneret et al. | 710/22 |
| 2003/0225739 A1 | 12/2003 | Chesson et al. | 707/1 |
| 2003/0229742 A1 | 12/2003 | Moss | 710/111 |
| 2004/0205267 A1 * | 10/2004 | Holm et al. | 710/35 |
| 2005/0144416 A1 | 6/2005 | Lin | 711/201 |

\* cited by examiner

SYSTEMS FOR IMPLEMENTING SDRAM CONTROLLERS, AND BUSES ADAPTED TO INCLUDE ADVANCED HIGH PERFORMANCE BUS FEATURES

This application is a Divisional of U.S. patent application Ser. No. 11/520,219, filed Sep. 13, 2006, now U.S. Pat. No. 7,797,467 which claims the benefit of U.S. Provisional Application No. 60/732,684, filed Nov. 1, 2005, and U.S. Provisional Application No. 60/736,012, filed Nov. 9, 2005, and are hereby incorporated by reference in their entirety.

FIELD OF THE INVENTION

The present invention relates to memory controllers generally and, more particularly, to systems for implementing SDRAM controllers and buses adapted to include Advanced High Performance Bus (AHB) features.

BACKGROUND OF THE INVENTION

In a controller with many ports, how the controller behaves under high load conditions is a consideration during design. Even when the average load is light, randomness in the arrival of requests can cause transient high load conditions to occur. Occasionally many, and perhaps all, of the requests can be simultaneously active.

A problem with servicing a large number of simultaneous requests is that each request is delayed by the requests serviced before it. All requests need to be serviced before any buffers overflow and before any real time deadlines are reached. In a complex system, designing a fixed set of priorities that ensures that all requests will be serviced in time can be difficult or impossible.

SUMMARY OF THE INVENTION

The present invention concerns a memory controller including an address incrementer and a page crossing detect logic. The address incrementer may be configured to generate a next address in a burst from a current address in the burst. The page crossing detect logic may be configured to determine whether the burst will cross a memory page boundary based on the current address and the next address. The memory controller may be configured to automatically split bursts crossing page boundaries.

The objects, features and advantages of the present invention include providing systems for implementing SDRAM controllers and buses adapted to include Advanced High Performance Bus (AHB) features that may (i) provide dynamically variable priority arbitration, (ii) adapt to request congestion, (iii) adapt to real time deadlines, (iv) provide a modular architecture for implementing programmable priority encoders and/or (v) be implemented in a multi-port memory controller.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
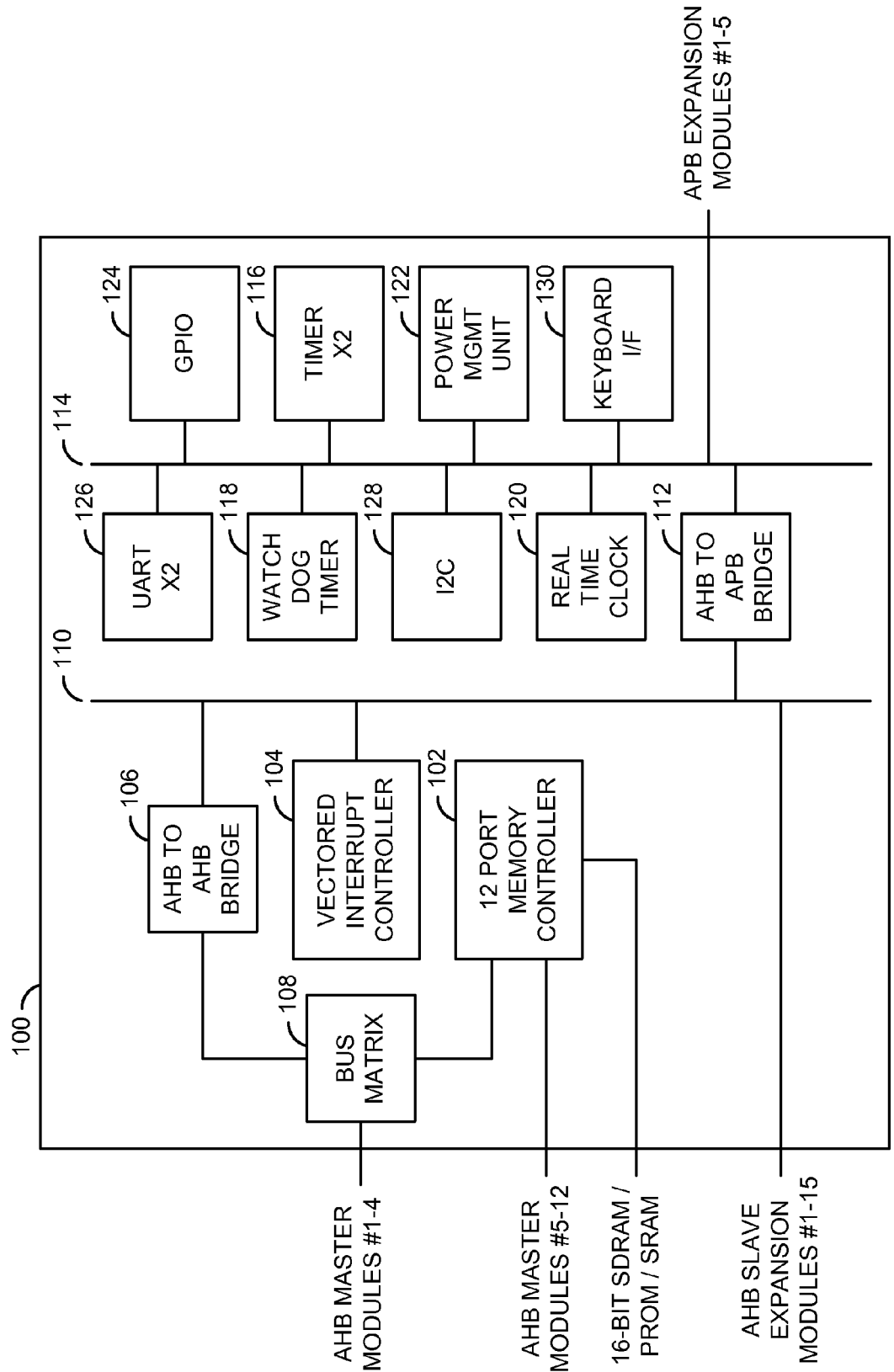
FIG. 1 is a block diagram illustrating an application processor architecture including a memory controller and buses in accordance with the present invention.

Referring to FIG. 1, a block diagram is shown illustrating an application processor architecture 100. The architecture 100 may be used by system designers to cost-effectively design System-on-Chips (SoC). The architecture 100 may comprise a memory controller 102, an interrupt controller 104, an AHB-to-AHB bridge 106, a bus matrix block 108, an AHB bus 110, an AHB-to-APB bridge 112, APB bus 114, a timer block 116, a watchdog timer (WDT) 118, a real time clock (RTC) 120, a power management unit (PMU) 122, a general purpose input/output (GPIO) block 124, a universal asynchronous receiver/transmitter (UART) block 126, an I2C block 128 and a keyboard interface 130. The memory controller 102 may be implemented, in one example, as a multi-ported synchronous dynamic random access memory (SDRAM) controller. In one example, the memory controller 102 may be implemented with 12 ports. The interrupt controller 104 may be implemented, in one example, as a 32-channel interrupt controller. The timer block 116 may be implemented, in one example, as a number of 16-bit timers.

In one example, a first number of AHB master modules may be coupled directly to the memory controller 102 and a second number of AHB master modules may be coupled to the memory controller 102 through the bus matrix 108. The memory controller 102 may be coupled to any of a synchronous dynamic random access memory (SDRAM), a static random access memory (SRAM) and/or a programmable read only memory (PROM). The present invention may be applicable also to Double Data Rate (DDR and DDR2) SDRAM.

The AHB bus 110 may be coupled directly to the interrupt controller 104 and the AHB-to-AHB bridge 106. A number of AHB slave modules may be coupled to the AHB bus 110. The AHB bus 110 may be coupled to the APB bus 114 via the AHB-to-APB bridge 112. The APB bus 114 may be coupled to each of the blocks 116-130. A number of APB expansion modules may be connected to the APB bus 114.

Figure 2:
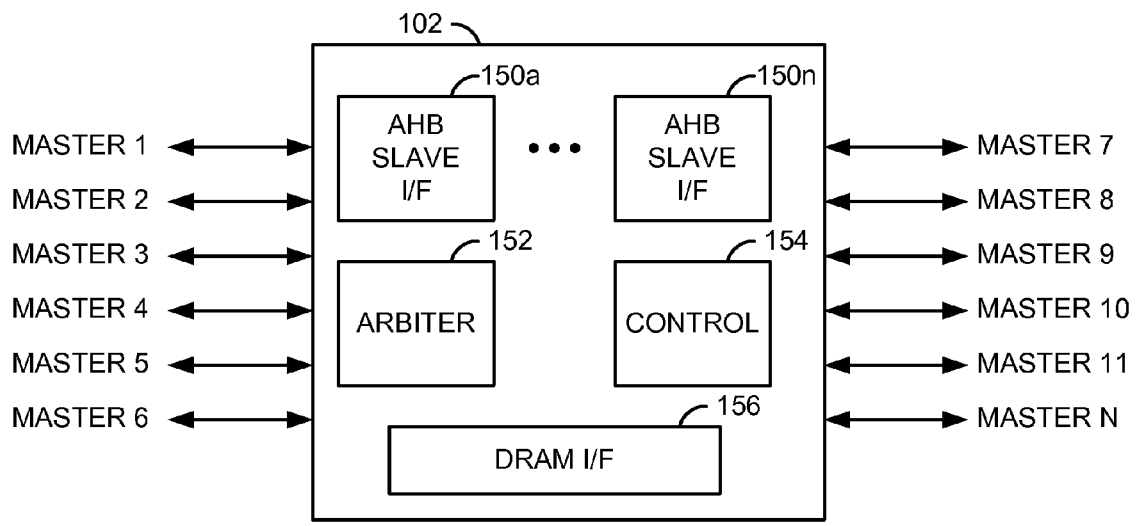
FIG. 2 is a block diagram illustrating a memory controller of FIG. 1.

Referring to FIG. 2, a more detailed block diagram is shown illustrating a memory controller 102 implemented in accordance with the present invention. In one example, the memory controller 102 may comprise a number of blocks (or circuits) 150a-150n, a block (or circuit) 152, a block (or circuit) 154 and a block (or circuit) 156. The blocks 150a-150n may be implemented, in one example, as AHB slave interfaces. The block 152 may be implemented, in one example, as an arbiter. The block 154 may be implemented, in one example, as a control block (or circuit). The block 156 may be implemented, in one example, as a dynamic random access memory (DRAM) interface. The arbiter 152 may allow operation without an external arbiter. The block 156 may allow operation without a first-in, first-out (FIFO) cache between the memory controller 102 and a memory device.

Figure 3:
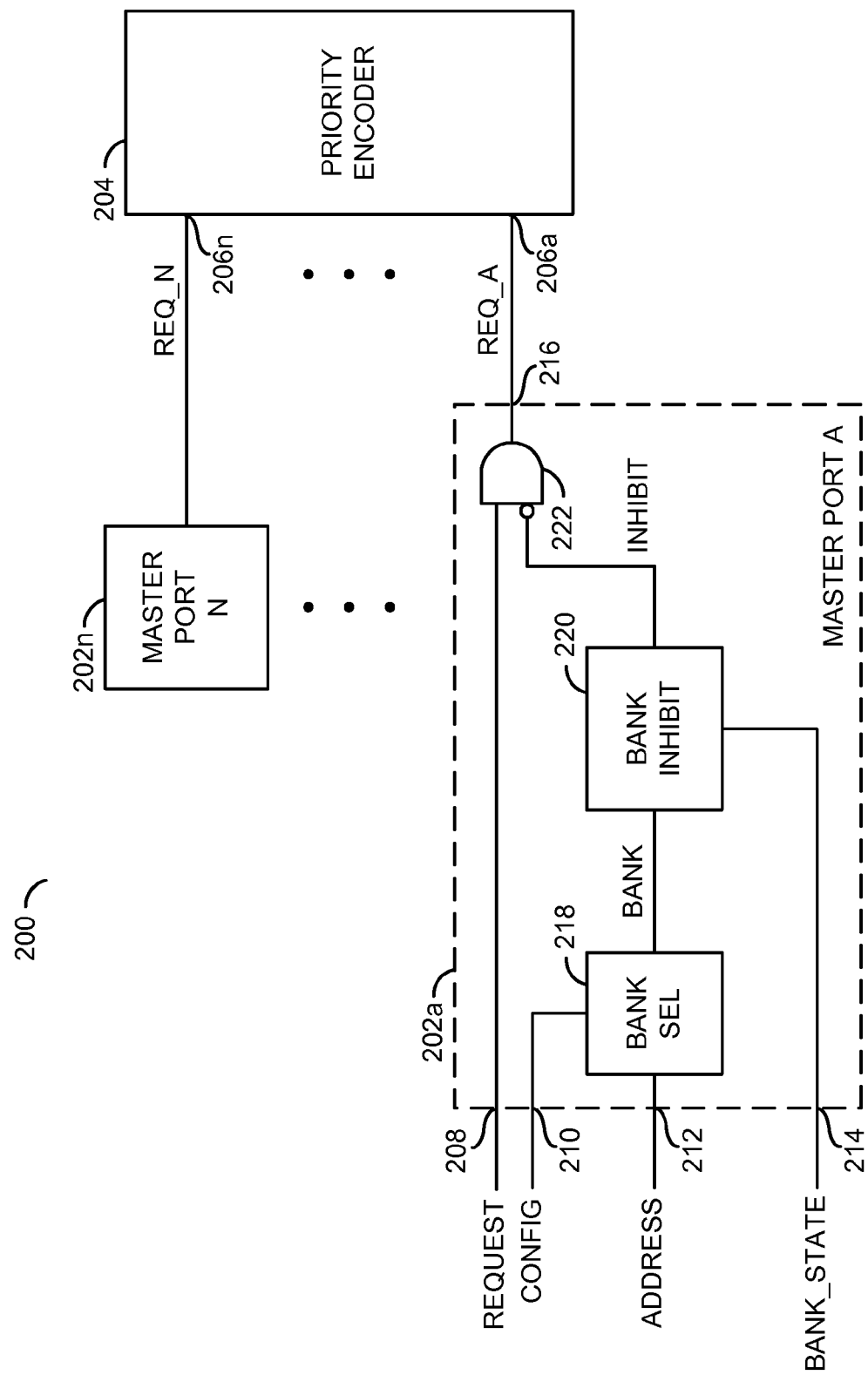
FIG. 3 is a block diagram illustrating an arbitration logic with bank select and inhibit logic.

Referring to FIG. 3, a block diagram is shown illustrating an example arbitration logic 200 in accordance with the present invention. For clarity, only one port is shown in detail. The arbitration logic 200 may include a number of blocks (or circuits) 202a-202n and a block (or circuit) 204. The blocks 202a-202n may be implemented, in one example, as a bank select and inhibit logic. The blocks 202a-202n may be implemented as part of each master, part of the memory controller 102, or as front end logic coupled between the respective masters and the memory controller 102. The block 204 may be implemented, in one example, as a priority encoder block. The block 204 may have a number of inputs 206a-206n. Each of the inputs 206a-206n may be coupled to a respective one of the blocks 202a-202n. For clarity, an example implementation of only the block 202a is illustrated.

The block 202a may have an input 208 that may receive a signal (e.g., REQUEST), an input 210 that may receive a signal (e.g., CONFIG), an input 212 that may receive a signal (e.g., ADDRESS) and an input 214 that may receive a signal (e.g., BANK_STATE). The block 202a may have an output 216 that may present a signal (e.g., REQ_A). The signal REQUEST may be implemented as a request signal. The signal CONFIG may be implemented, in one example, to provide an indication of a particular SDRAM configuration selected. The signal ADDRESS may be implemented, in one example, as an address signal. The signal BANK_STATE may be configured to indicate a state of one or more banks. For example, the signal BANK_STATE may be configured to indicate which banks are active or busy. In one example, the signals REQUEST and ADDRESS may be received from the master device.

In one example, the block 202a may comprise a block (or circuit) 218, a block (or circuit) 220 and a block (or circuit) 222. The block 218 may be implemented, in one example, as a bank selection block. The block 220 may be implemented, in one example, as a bank inhibit block. The block 222 may be implemented, in one example, as a logic gate. In one example, the block 222 may be implemented as an AND gate.

The block 218 may have a first input that may receive the signal CONFIG, a second input that may receive the signal ADDRESS and an output that may present a signal (e.g., BANK). The block 220 may have a first input that may receive the signal BANK, a second input that may receive the signal BANK_STATE and an output that may present a signal (e.g., INHIBIT). The block 222 may have a first input that may receive the signal REQUEST, a second input that may receive the signal INHIBIT and an output that may present the signal REQ_A. In one example, the first input of the block 222 may be a non-inverting input and the second input may be an inverting input.

In one example, the block 218 may be implemented as a multiplexer circuit. The block 218 may be configured to select two bank bits from the signal ADDRESS based on a value of the signal CONFIG. The block 218 may be configured to present the two bank bits via the signal BANK. The block 220 may be configured to inhibit a request to a particular bank corresponding to the bits in the signal BANK based on the state of one or more banks, as indicated via the signal BANK_STATE.

Figure 17:
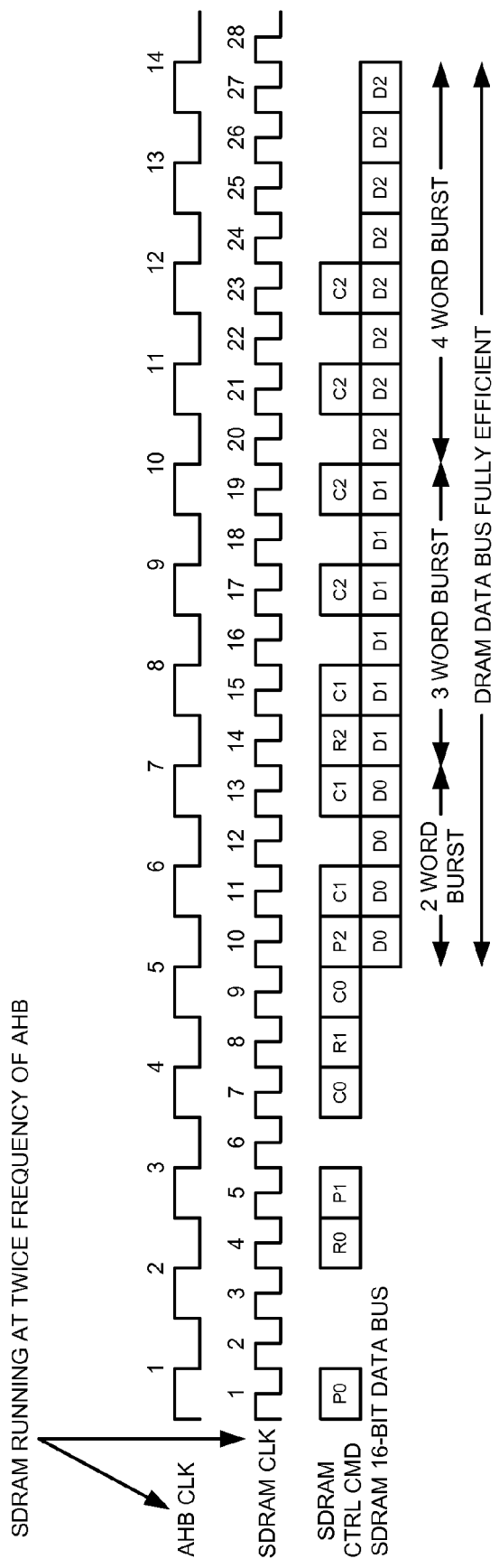
FIG. 17 is a timing diagram illustrating overlap of transactions to different banks.

An SDRAM controller with many ports may be designed to maximize usable SDRAM bandwidth by overlapping the address and data phases of SDRAM accesses. The number of cycles used for address and data may be designed to be well balanced. In one example, a request may comprise a burst of eight SDRAM accesses. A burst of eight SDRAM accesses may take eight cycles for the data. Most of the time both row and column addresses may be part of the request. Setting the row and column addresses may take three cycles each for pre-charge, row address and column address, for a total of nine cycles. An example showing overlap of three transactions involving setting row and column addresses is shown in FIG. 17.

A limitation of SDRAM address and data overlap is that the address and data are for different banks. When the address and data are for the same bank, the SDRAM controller can not overlap the address and data phases, and bandwidth is wasted. In one example, an SDRAM may have four banks. However, the present invention is also applicable to two and eight bank (e.g., DDR) memories. For four bank memory random requests, there is a 1 in 4 chance that the bank involved in the accesses is the same. Since the same bank is involved, overlap of the address and data phases is prevented and one-fifth of the bandwidth is wasted. For example, an eight access burst to a different bank may have been serviced in between every back to back pair of accesses to the same bank.

The present invention may provide SDRAM controllers adapted to implement novel primary/secondary arbitration logic to optimize the use of SDRAM banks. The arbitration logic may be implemented to overlap transactions so that DRAM data bandwidth is more fully utilized. Primary arbitration may be used when the memory controller 102 is idle. All requests may be fed into the priority encoder 204 and the highest priority request serviced. Secondary arbitration may be used when the memory controller 102 is already servicing one or more requests. The signal BANK_STATE may be received from the memory controller 102 and fed to the respective block 202a-202n for each port. Requests that are not inhibited may be fed into the priority encoder 204 and the highest priority request serviced.

Figure 4:
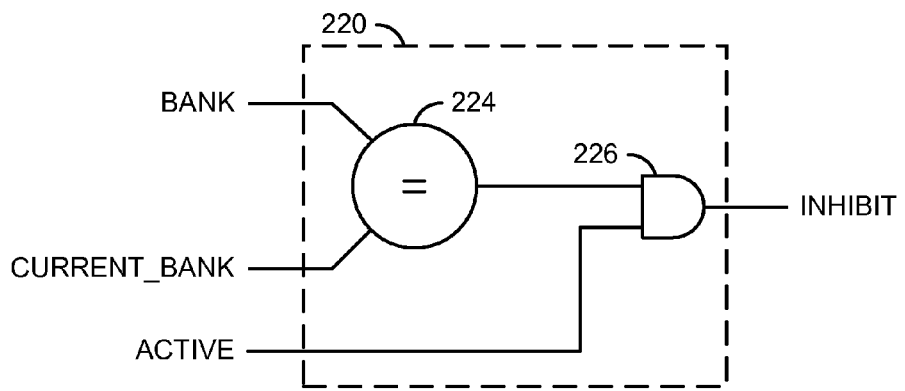
FIG. 4 is a block diagram illustrating an example implementation of a bank inhibit logic of FIG. 3.

Referring to FIG. 4, a block diagram is shown illustrating an example implementation of the bank inhibit logic 220 of FIG. 3. In one example, the bank inhibit logic 220 may be configured to support overlap of two transactions. When the bank associated with a request from a port matches a current bank and the current bank is active, the request signal for the port is generally inhibited (e.g., the signal INHIBIT may be asserted for the respective port). In one example, the bank inhibit logic 220 may be implemented using a comparator 224 and a gate 226. In one example, the gate 226 may be implemented as an AND gate. However, other gates may be implemented accordingly to meet the design criteria of a particular implementation.

In one example, the signal BANK_STATE may be implemented as a signal (e.g., CURRENT_BANK) and a signal (e.g., ACTIVE). The signals BANK and CURRENT_BANK may be presented to inputs of the comparator 224. An output of the comparator 224 may be presented to a first input of the gate 226. The signal ACTIVE may be presented to a second input of the gate 226. The gate 226 may present the signal INHIBIT at an output. In one example, the comparator 224 may be configured to determine whether the signal BANK and the signal CURRENT_BANK have values that are equal. In one example, the signals CURRENT_BANK and ACTIVE indicate the state of a single bank.

Figure 5:
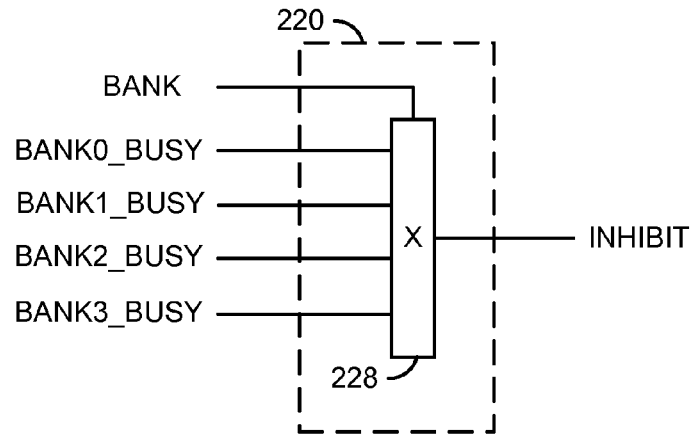
FIG. 5 is a block diagram illustrating another example implementation of a bank inhibit logic of FIG. 3.

Referring to FIG. 5, a block diagram is shown illustrating another example of the bank inhibit logic 220 of FIG. 3. In one example, the bank inhibit logic 220 may be implemented to support overlap of up to four transactions. For example, the bank inhibit logic 220 may comprise a four-to-one multiplexer 228. When the bank of a particular port is busy, the bank inhibit logic 220 may be configured to inhibit the request signal for that port. For example, the signal BANK_STATE may comprise a busy signal from each of a number of banks (e.g., BANK0_BUSY . . . BANK3_BUSY). Each of the signals BANK0_BUSY . . . BANK3_BUSY may be presented to a respective input of the multiplexer 228. The signal BANK may be presented to a control input of the multiplexer 228. The multiplexer 228 may be configured to select one of the signals BANK0_BUSY . . . BANK3_BUSY for presentation as the signal INHIBIT in response to the signal BANK.

Figure 6:
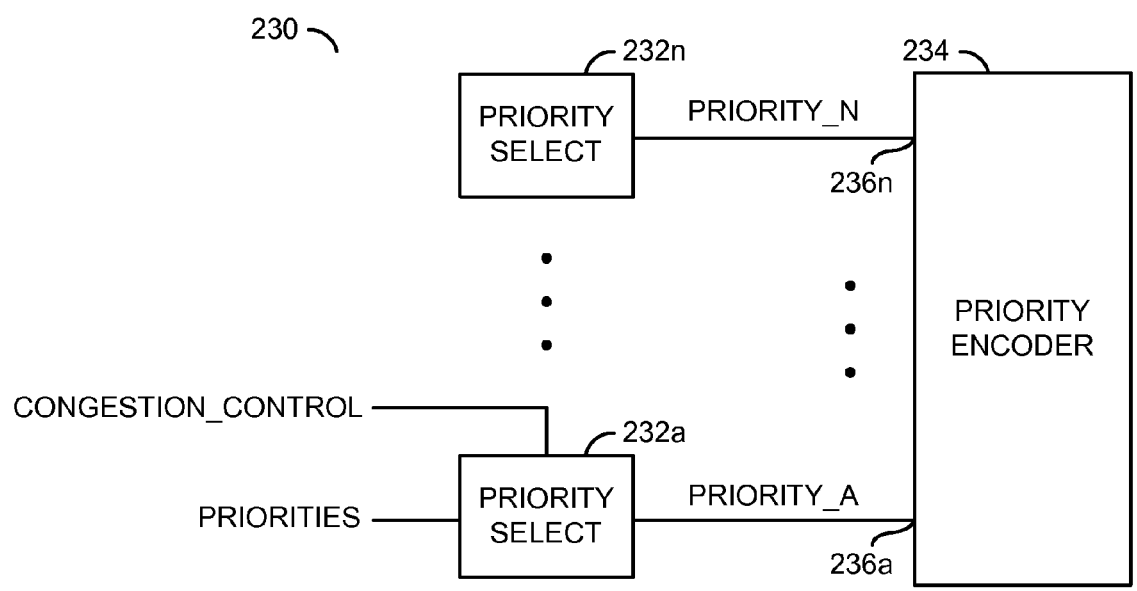
FIG. 6 is a block diagram illustrating a dynamically variable arbitration logic.

Referring to FIG. 6, a block diagram is shown illustrating a priority arbitration logic 230. In one example, the priority arbitration logic 230 may be implemented as a dynamically variable priority arbitration logic. The arbitration logic 230 may enable priorities to dynamically vary in order for the memory controller 102 to adapt to request congestion and real-time deadlines. For clarity, signals for only one port are illustrated. However, a number of ports may be implemented accordingly.

The priority arbitration logic 230 may comprise a number of blocks (or circuits) 232a-232n and a block (or circuit) 234. The blocks 232a-232n may be implemented, in one example, as priority select blocks. The block 234 may be implemented, in one example, as a priority encoder block. In one example, the block 204 of FIG. 3 and the block 234 may be implemented as a single priority encoder block. In another example, the block 204 and the block 234 may be implemented as separate priority encoder modules.

The block 232a may have a first input that may receive a signal (e.g., CONGESTION_CONTROL) and a second input that may receive one or more signals (e.g., PRIORITIES). The block 232a may have an output that may present a signal (e.g., PRIORITY_A). The block 234 may have a number of inputs 236a-236n that may receive respective signals (e.g., PRIORITY_A, . . . , PRIORITY_N) from each of a number of ports (e.g., PORTa-PORTn). In one example, the block 232a may be configured to select a single one of the signals PRIORITIES for presentation as the signal PRIORITY_A based on the signal CONGESTION_CONTROL.

Figure 7:
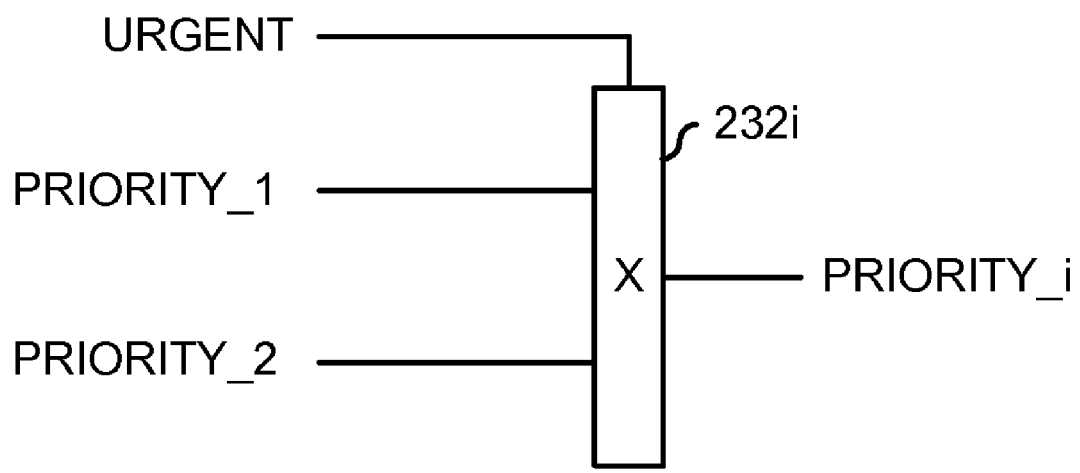
FIG. 7 is a block diagram illustrating an example implementation of a priority select logic of FIG. 6.

Referring to FIG. 7, a block diagram is shown illustrating an example implementation of a representative priority select block 232i of FIG. 6. In one example, the block 232i may be implemented as a multiplexer circuit. The block 232i may have a first input that may receive a signal (e.g., PRIORITY_1) and a second input that may receive a signal (e.g., PRIORITY_2). The block 232i may have a control input that may receive a signal (e.g., URGENT) and an output that may present the signal PRIORITY_i, where i represents the respective port designation. In one example, the signal CONGESTION_CONTROL may be implemented as the signal URGENT. For example, a master may be configured to assert the signal URGENT to increase the priority of a corresponding request when the request has been delayed too long due to congestion (e.g., continuous higher priority requests from other masters).

In one example, the multiplexer 232i may be configured to select the signal PRIORITY_1 when the signal URGENT has a first value (e.g., 0) and the signal PRIORITY_2 when the signal URGENT has a second value (e.g., 1). In one example, the signal URGENT may be asserted to prevent a buffer from overflowing or a real time deadline from being passed. Other implementations of the priority select logic 232i may be implemented to meet the design criteria of a particular implementation. For example, the logic 232i may be configured to smoothly increment the signal PRIORITY_i up to a highest priority value as a request becomes more urgent. In general, more complex priority select logic should not be implemented without proven benefits because the cost of the logic is multiplied by the number of ports.

Base priorities may be set differently depending on whether real-time deadlines are involved or not. For example, all devices with real-time constraints may have higher priorities than devices without real-time constraints. In one example, the closest deadline may have the highest priority. Setting the closest deadline to the highest priority is often easy to do because many real-time constraints are generally periodic or approximately periodic.

In another example, where the real-time constraints are of a type (or types) that is (are) well behaved, devices that make the most frequent requests may have the highest priority. Assignment of base priorities may be different when there are no real-time constraints. In one example, devices with the smallest demand or least frequent requests may have the highest priority.

A strategy for relieving congestion is generally desirable. As utilization approaches 100%, latency increases without bound. In practice, lower priority devices may never get serviced if higher priority devices are using 100% of the available resources. A solution to lower priority devices not being serviced is to reduce demand when congestion is detected. The present invention may be used to reduce demand by dynamically reducing priorities. Alternately, the present invention may be used to selectively increase priority for more urgent requests. Increasing priority for more urgent requests effectively reduces all the other priorities while leaving the other priorities unchanged. For complex behavior (e.g., where real-time constraints vary or demand varies), improved performance may be obtained by changing the priorities in advance when the priorities can be predicted and making the priorities adaptive when the priorities can not be predicted.

Figure 8:
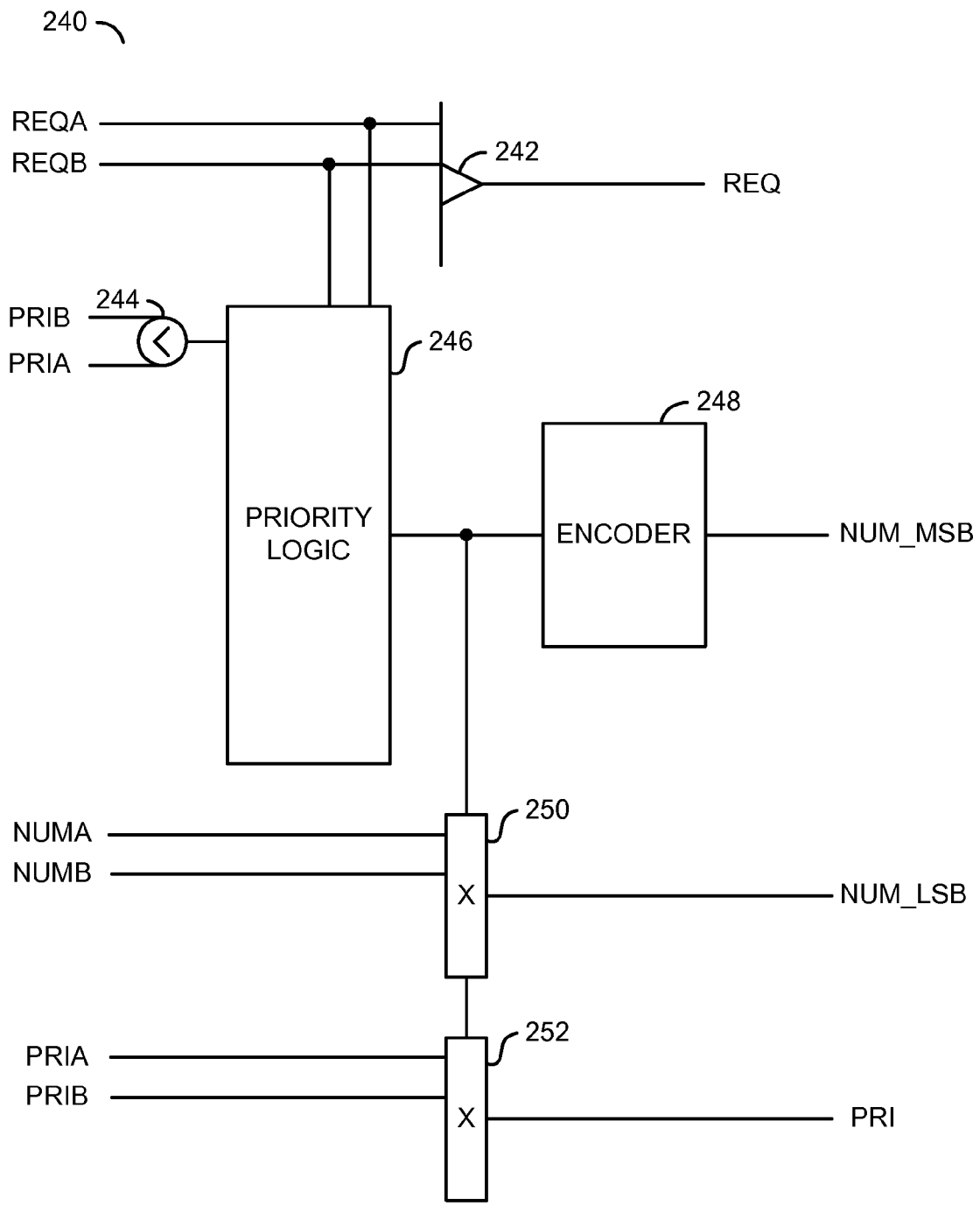
FIG. 8 is a block diagram illustrating a modular architecture for a programmable priority encoder.
Figure 9:
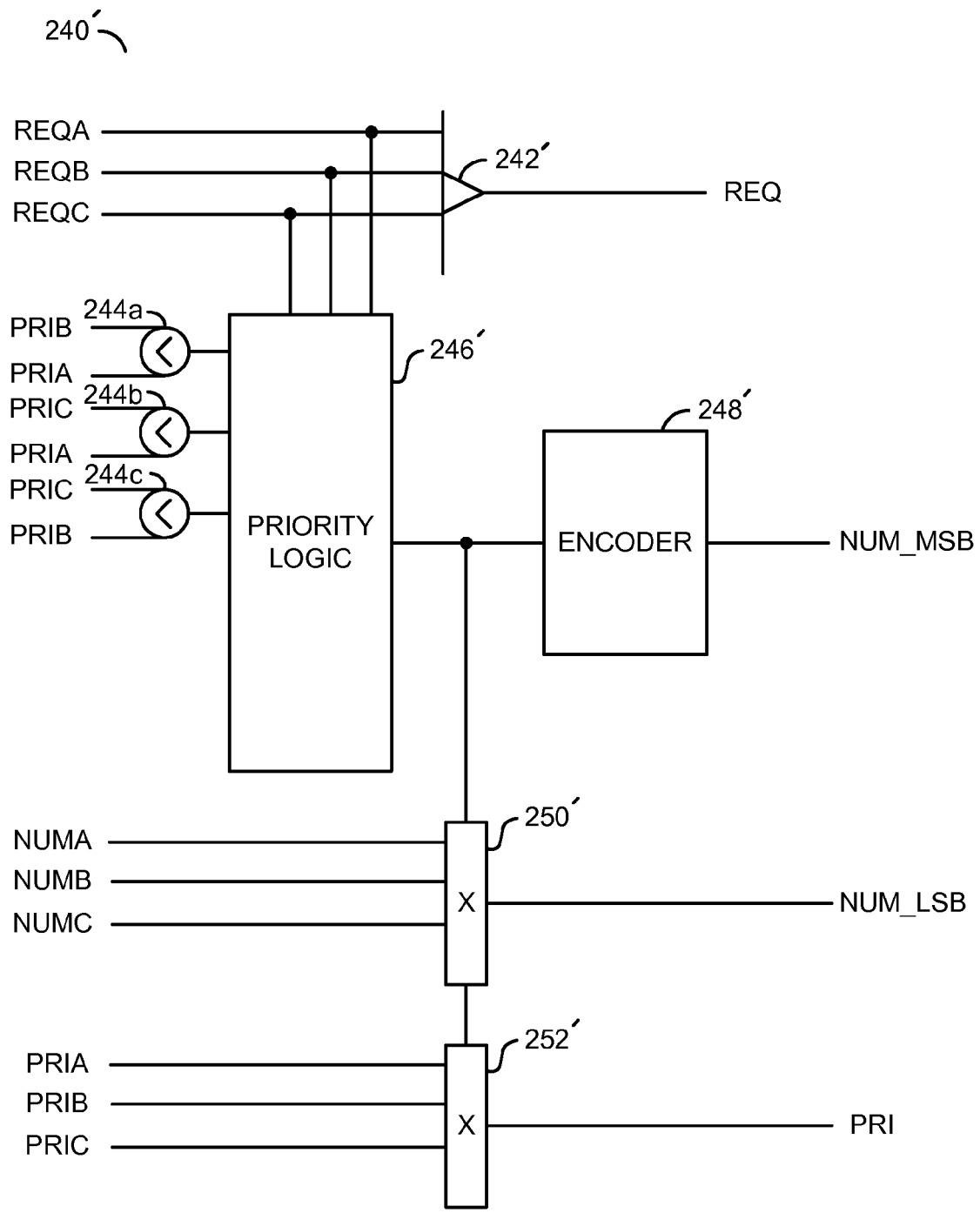
FIG. 9 is another example of a modular architecture for a programmable priority encoder.
Figure 10:
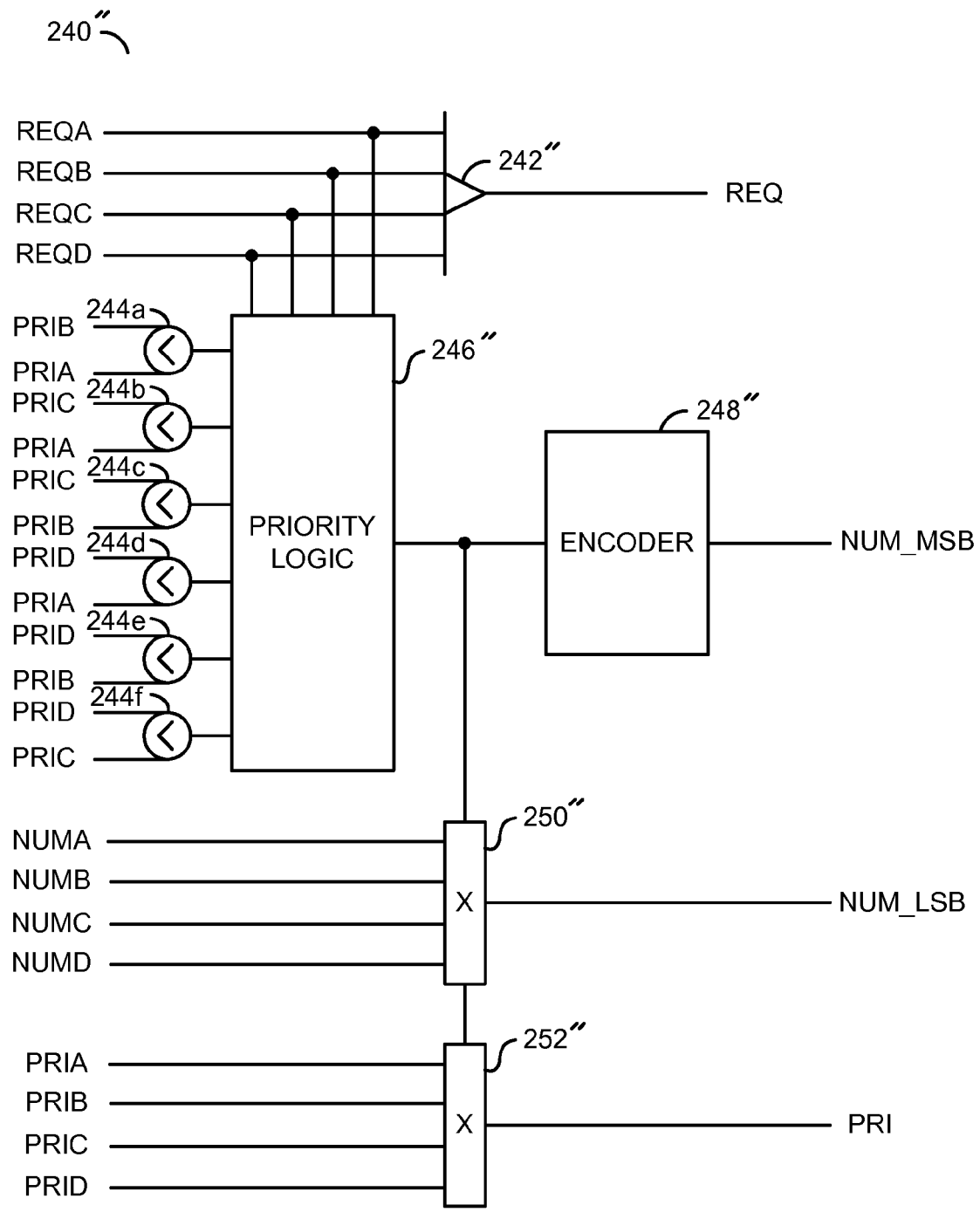
FIG. 10 is yet another example of a modular architecture for a programmable priority encoder.

Referring to FIGS. 8-10, block diagrams are shown illustrating example modular priority encoders in accordance with the present invention. Priority encoders are widely used for arbitration logic. The memory controller 102, implemented in accordance with the present invention, may include a priority encoder with programmable priorities to select which master transactions are handled first. The design may also allow for variations with different numbers of masters. Neither programmable priority nor a varying number of inputs is a simple matter. The present invention generally provides a modular architecture for implementing programmable priority encoders. The modular architecture generally eases the design process for implementing the programmable priority encoders with an arbitrary number of inputs by constructing the encoders in a modular fashion. Block diagrams illustrating examples of modular architectures with 2, 3, and 4 inputs, respectively, are illustrated in FIGS. 8, 9 and 10, respectively.

Referring to FIG. 8, a more detailed block diagram is shown illustrating a programmable priority encoder 240 in accordance with the present invention. In one example, the priority encoders 204 and 234 may be implemented using one or more modular priority encoders 240. In one example, the priority encoder 240 may be configured for arbitration between two ports. The priority encoder 240 may receive a number of signals from a first port (e.g., REQA, PRIA and NUMA) and a number of signals from a second port (e.g., REQB, PRIB and NUMB). The priority encoder 240 may have a first output that may present a signal (e.g., REQ), a second output that may present a signal (e.g., NUM_MSB), a third output that may present a signal (e.g., NUM_LSB) and a fourth output that may present a signal (e.g., PRI).

In one example, the priority encoder 240 may comprise a block (or circuit) 242, a block (or circuit) 244, a block (or circuit) 246, a block (or circuit) 248, a block (or circuit) 250 and a block (or circuit) 252. The block 242 may be implemented, in one example, as an OR gate. The block 244 may be implemented, in one example, as a comparator. The block 246 may be implemented, in one example, as a priority logic block. The block 248 may be implemented, in one example, as an encoder block. The block 250 may be implemented, in one example, as a multiplexer. The block 252 may be implemented, in one example, as a multiplexer.

In one example, the signal REQA may be presented to a first input of the block 242 and a first input of the block 246. The signal REQB may be presented to a second input of the block 242 and a second input of the block 246. An output of the block 242 may present the signal REQ. The signal REQ may be generated in response to the signals REQA and REQB.

The signals PRIA and PRIB may be presented to a first input and a second input, respectively, of the block 244 and a first input and a second input, respectively, of the block 252. An output of the block 244 may be connected to a third input of the block 246. The block 244 may be configured to determine which priority signal (e.g., PRIA or PRIB) has a higher value. The block 246 may have an output that may be presented to an input of the block 248, a control input of the block 250 and a control input of the block 252. The block 248 may have an output that may present the signal NUM_MSB.

The signal NUMA may be presented to a first input of the block 250. The signal NUMB may be presented to a second input of the block 250. The block 250 may have an output that may present the signal NUM_LSB. The block 252 may have an output that may present the signal PRI. The signal PRI may be generated in response to the signals PRIA, PRIB and the output of the priority logic block 246.

Referring to FIG. 9, a more detailed block diagram is shown illustrating an example of a 3-input programmable priority encoder 240'. The priority encoder 240' may be implemented similarly to the encoder 240 shown in FIG. 8, except that the encoder 240' may be configured to receive signals from three ports rather than two. The priority encoder 240' may comprise a block 242', a block 244a, a block 244b, a block 244c, a block 246', a block 248', a block 250' and a block 252'. In one example, the block 242' may be implemented as a three input OR gate. The block 242' may receive the signal REQA, the signal REQB and a signal (e.g., REQC). The block 244a may receive the signals PRIA and PRIB. The block 244b may receive the signal PRIA and a signal (e.g., PRIC). The block 244c may receive the signals PRIB and PRIC. The block 246' may have a first input that may receive an output from the block 244a, a second input that may receive an output from the block 244b and a third input that may receive an output from the block 244c. The block 246' may have additional inputs that may receive the signals REQA, REQB and REQC. An output of the block 246' may be presented to an input of the block 248', an input of the block 250' and an input of the block 252'. The block 248' may be configured to generate the signal NUM_MSB. The block 250' may receive the signal NUMA, the signal NUMB and a signal (e.g., NUMC). The block 250' may present the signal NUM_LSB. The block 252' may receive the signals PRIA, PRIB and PRIC. The block 252' may have an output that may present the signal PRI.

Referring to FIG. 10, a more detailed block diagram is shown illustrating an example implementation of a priority encoder 240" in accordance with the present invention. The encoder 240" may be implemented as a four input priority encoder. The encoder 240" may be implemented similarly to the encoders 240 and 240' in FIGS. 8 and 9, respectively.

The priority encoder 240" may comprise a block 242", a block 244a, a block 244b, a block 244c, a block 244d, a block 244e, a block 244f, a block 246", a block 248", a block 250" and a block 252". In one example, the block 242" may be implemented as a four input OR gate. The block 242" may receive the signal REQA, the signal REQB, the signal REQC and a signal (e.g., REQD). The block 244a may receive the signals PRIA and PRIB. The block 244b may receive the signal PRIA and the signal PRIC. The block 244c may receive the signals PRIB and PRIC. The block 244d may receive the signal PRIA and a signal (e.g., PRID). The block 244e may receive the signals PRIB and PRID. The block 244f may receive the signals PRIC and PRID. The block 246" may have a first input that may receive an output from the block 244a, a second input that may receive an output from the block 244b, a third input that may receive an output from the block 244c, a fourth input that may receive an output from the block 244d, a fifth input that may receive an output from the block 244e and a sixth input that may receive an output from the block 244f. The block 246" may have additional inputs that may receive the signals REQA, REQB, REQC and REQD. An output of the block 246" may be presented to an input of the block 248", an input of the block 250" and an input of the block 252". The block 248" may be configured to generate the signal NUM_MSB. The block 250" may receive the signal NUMA, the signal NUMB, the signal NUMC and a signal (e.g., NUMD). The block 250" may present the signal NUM_MSB. The block 252" may receive the signals PRIA, PRIB, PRIC and PRID. The block 252" may have an output that may present the signal PRI.

The signals REQA, REQB, REQC and REQD generally represent request inputs from earlier modules, or from masters when representing leaf module request inputs. The signal REQ generally represents the request output. The signal REQ may be implemented as the logical OR of all the request inputs. The signals NUMA, NUMB, NUMC and NUMD generally represent master number inputs from earlier modules. In general, leaf modules do not have NUM inputs. The signal NUM_MSB generally represents the Most Significant Bits (MSB) of the master number output. The signal NUM_LSB generally represents the Least Significant Bits (LSB) of the master number output. In general, leaf modules do not generate the signal NUM_LSB. The signals PRIA, PRIB, PRIC and PRID generally represent priority inputs from earlier modules. Priority inputs for leaf modules may come from registers associated with masters. The signal PRI generally represents the priority output.

In general, a programmable priority encoder may be implemented for a number of ports N. In general, priority encoders with N=2, 3 or 4 are more practical because the number of comparator blocks 244 increases as $N(N-1)/2$. A priority logic block 246, 246' or 246" may be configured to take the results of the compares and the requests to select the 1 out of N highest priority. An encoder block 248, 248' or 248" may be configured to encode the 1 of N highest priority to output the most significant bits (MSB) of the number of the highest priority port. A first multiplexer block 250, 250', 250" may be configured to select the port number least significant bits (LSB) from earlier levels, if any. The first multiplexer block may be omitted in leaf modules because the port number least significant bits may degenerate to no bits when there are no earlier levels. A second multiplexer block 252, 252', 252" may be configured to output the priority of the winning port.

A priority encoder with an arbitrary number of inputs may be constructed using a tree of 2 input modules. When the number of inputs (ports) is a power of two, the encoder is generally a complete binary tree. When the number of inputs is between powers of two, the encoder may be derived by pruning the tree for the next higher power of two. The modules with 3 and 4 inputs (described above in connection with FIGS. 9 and 10) may allow higher speed implementations with fewer levels at a cost of modestly more logic. For example, the 3-input and 4-input modules may replace 2 levels of 2-input modules.

Example implementations of a variety of modules may be further illustrated by the following Verilog code:

```
module pri2( reqo, num, pri, req, pri1, pri0 );
    output reqo;
    output num;
    output [3:0] pri;
    input [1:0] req;
    input [3:0] pri1, pri0;
    assign reqo = req[1] | req[0] ;
    assign num = req[1] & ~( req[0] & ~(pri1 < pri0) );
    assign pri =   num ? pri1 : pri0;
endmodule
module pri4( reqo, num, pri, req, pri3, pri2, pri1, pri0 );
    output reqo;
    output [1:0] num;
    output [3:0] pri;
    input [3:0] req;
    input [3:0] pri3, pri2, pri1, pri0;
    wire [3:0] prib, pria;
    pri2 pri2a( reqa, numa, pria, req[1:0], pri1, pri0);
    pri2 pri2b( reqb, numb, prib, req[3:2], pri3, pri2);
    assign reqo =       reqb | reqa;
    assign num[1] =     reqb & ~( reqa & ~(prib < pria) );
    assign num[0] =     num[1] ? numb : numa;
    assign pri =        num[1] ? prib : pria;
endmodule
module pri8( reqo, num, pri, req, pri7, pri6, pri5, pri4, pri3,
pri2, pri1, pri0 );
    output reqo;
    output [2:0] num;
    output [3:0] pri;
    input [7:0] req;
    input [3:0] pri7, pri6, pri5, pri4, pri3, pri2, pri1, pri0;
    wire [1:0] numb, numa;
    wire [3:0] prib, pria;
    wire reqb, reqa;
    pri4 pri4a( reqa, numa, pria, req[3:0], pri3, pri2, pri1, pri0
);
    pri4 pri4b( reqb, numb, prib, req[7:4], pri7, pri6, pri5, pri4
);
    assign reqo =       reqb | reqa;
    assign num[2] =     reqb & ~( reqa & ~(prib < pria) );
    assign num[1:0] =   num[2] ? numb : numa;
    assign pri =        num[2] ? prib : pria;
endmodule
module pri16( reqo, num, pri, req, priF, priE, priD, priC, priB,
priA, pri9, pri8, pri7, pri6, pri5, pri4, pri3, pri2, pri1, pri0
);
    output reqo;
    output [3:0]num;
    output [3:0] pri;
    input [15:0] req;
    input [3:0] priF, priE, priD, priC, priB, priA, pri9, pri8,
pri7, pri6, pri5, pri4, pri3, pri2, pri1, pri0;
    wire [1:0] numd, numc, numb, numa;
    wire [3:0] prid, pric, prib, pria;
    wire reqd, reqc, reqb, reqa;
    pri4 pri4a( reqa, numa, pria, req[ 3: 0], pri3, pri2, pri1,
pri0 );
    pri4 pri4b( reqb, numb, prib, req[ 7: 4], pri7, pri6, pri5,
pri4 );
    pri4 pri4c( reqc, numc, pric, req[11: 8], priB, priA, pri9,
pri8 );
    pri4 pri4d( reqd, numd, prid, req[15:12], priF, priE, priD,
priC );
    assign reqo =       reqd | reqc | reqb [ reqa;
    wire cmpba =        prib < pria;
    wire cmpca =        pric < pria;
    wire cmpcb =        pric < prib;
    wire cmpda =        prid < pria;
    wire cmpdb =        prid < prib;
    wire cmpdc =        prid < pric;
    wire wind =         reqd & ~( reqc & ~cmpdc | reqb & ~cmpdb
| reqa & ~cmpda );
    wire winc =         reqc & ~( reqd & cmpdc | reqb & ~cmpcb
| reqa & ~cmpca );
    wire winb =         reqb & ~( reqd & cmpdb | reqc & cmpcb
| reqa & ~cmpba );
    wire wina =         reqa & ~( reqd & cmpda | reqc & cmpca
| reqb & cmpba );
    assign num[3:2] = ;    { wind | winc, wind | winb };
    assign num[1:0] =      {2 {wind}} & numd | {2{winc}} & numc |
{2{winb}} & numb | {2{wina}} & numa;
    assign pri =           {4{wind}} & prid | {4{winc}} & pric |
{4{winb}} & prib | {4{wina}} & pria;
endmodule
```

Although the 8-input module pri8 is illustrated above comprising two 4-input modules, four 2-input modules could also be used. Similarly, although the 16-input module pri16 is illustrated above comprising four 4-input modules, the 16-input module pri16 could also be implemented with two 8-input modules.

A feature of the encoders implemented in accordance with the present invention is how ties are broken. A tie occurs when two of the programmed priorities are equal. For example, consider the two input encoder 240 of FIG. 8. The encoder 240 may be configured so that higher priority is specified by lower numbers (e.g., a priority of one is higher than a priority of two). In one example, ties may be broken in favor of masters with lower numbers (e.g., master A beats master B when priorities are equal). Breaking ties in favor of masters with lower numbers may be implemented by carefully biasing the compare stage by comparing PRIB<PRIA. Master B wins when the compare is true. When the priorities are equal, the compare is false and Master A wins. Other tie-breaking schemes operable with embodiments of the present invention will be apparent to those skilled in the art.

Another feature of the priority encoders implemented in accordance with the present invention is that the comparisons in leaves of the tree may be static after priorities are programmed. Having static comparisons allows all the compare logic to be eliminated by programming the compare results. For example, the leaves of the tree could be 4-input modules, and all 6 compares could be eliminated by instead providing 6 bits representing the compare results.

Figure 11:
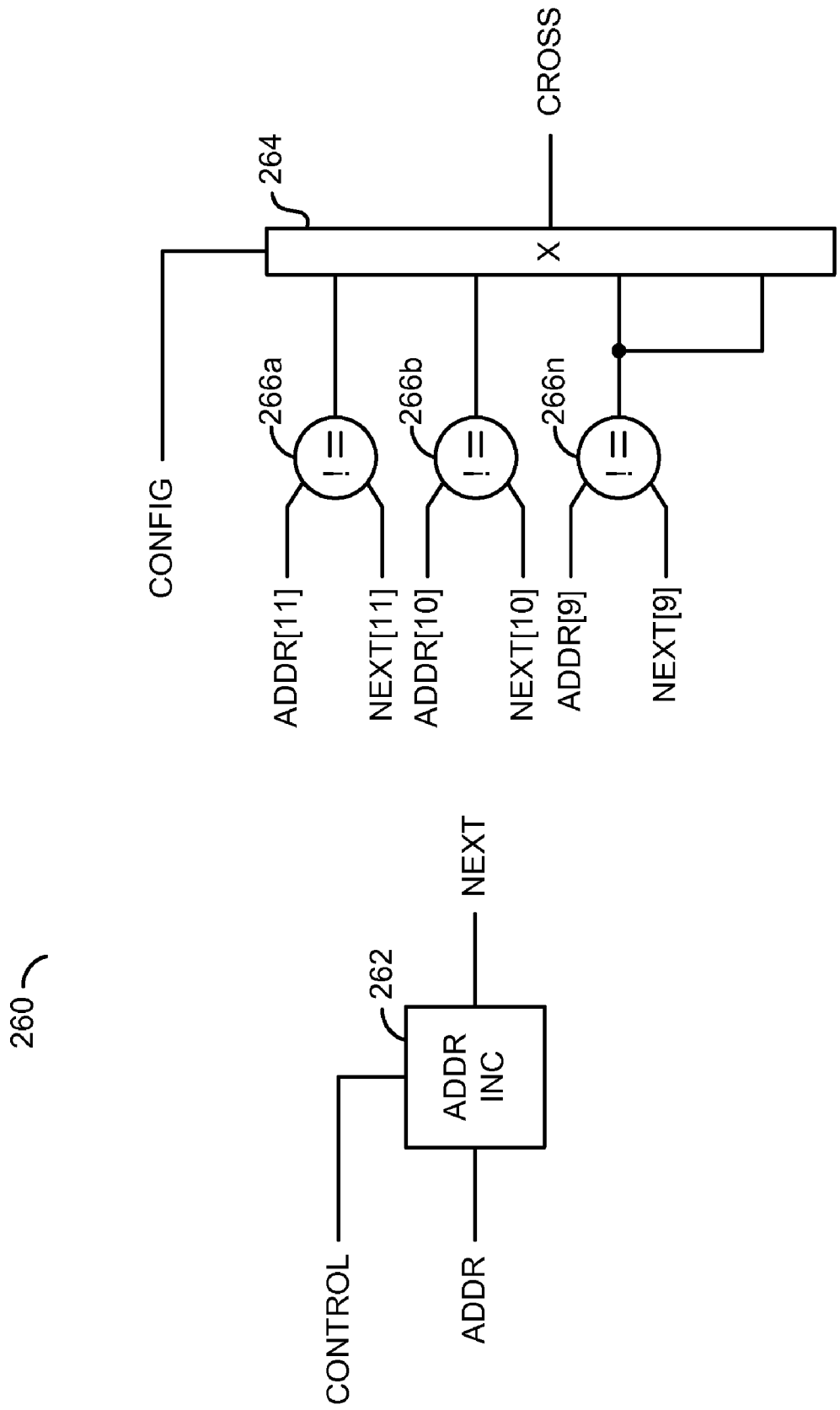
FIG. 11 is a block diagram illustrating a page crossing detect logic.

Referring to FIG. 11, a block diagram is shown illustrating a page crossing detect logic 260 in accordance with the present invention. In one example, the memory controller 102 may include the page crossing detect logic 260. The memory controller 102 may be configured to provide automatic burst splitting at DRAM page boundaries. In one example, a SDRAM controller may have multiple ports to support multiple AHB masters. One design challenge regards how to handle the case when an AHB burst transaction crosses a DRAM page boundary. The AHB specification does not handle such a case. The AHB specification states that bursts may not cross a 1K byte boundary. Prohibiting bursts from crossing a 1K byte boundary has two problems. First, all SDRAM page boundaries are not handled because SDRAM pages can be smaller than 1K bytes. Second, all masters have to handle 1K byte boundary crossings.

The present invention may provide a solution to the DRAM page crossing in an AHB burst transaction problem by relaxing the 1K byte boundary limitation and instead checking for SDRAM page crossings in the memory controller 102. By checking for SDRAM page crossings in the memory controller 102, the memory controller 102 handles page boundary crossings instead of the masters. A burst that crosses a page boundary is still a problem because two banks instead of one are pre-charged and activated. However, instead of running two SDRAM transactions, the memory controller 102 implemented in accordance with the present invention transparently and automatically splits bursts at DRAM page boundaries.

When the memory controller 102 detects a burst crossing an SDRAM page, the memory controller 102 artificially ends the burst. The incomplete burst remains active on the input ports of the memory controller 102. The incomplete burst is handled as a new transaction when the arbitration logic of the memory controller 102 selects the port of the incomplete burst for service. The incomplete burst is handled similarly to an ordinary burst that terminates early. Incomplete bursts always terminate early because the burst length indicates the length of the entire burst, not the incomplete portion. The early termination incurs a small penalty for read bursts. The penalty may be handled more efficiently by including extra logic to remember the true length of the incomplete bursts. However, page crossings are generally not frequent enough to justify the cost of the extra logic multiplied by the number of ports.

In one example, address incrementers may be included in the memory controller 102 to generate a next address in a burst. The page crossing detect logic may compare the bit immediately above the page address bits of the current address and the next address. When the bits are not equal, the next address is in a different page. A memory controller implemented in accordance with the present invention may support four different SDRAM configurations with three different page sizes. For example, a four-to-one multiplexer may be used to select one of three crossing detectors depending on the configuration of the memory controller.

In one example, the page crossing detect logic 260 may comprise a block 262, a block 264 and a number of blocks 266a-266n. The block 262 may be implemented, in one example, as an address incrementing block. The block 264 may be implemented, in one example, as a multiplexer block. The blocks 266a-266n may be implemented, in one example, as comparators. In one example, the blocks 266a-266n may be configured to determine whether one input is not equal to another input. The block 262 may have a first input that may receive a signal (e.g., CONTROL), a second input that may receive a signal (e.g., ADDR) and an output that may present a signal (e.g., NEXT). The block 262 may be configured to generate the signal NEXT in response to the signals ADDR and CONTROL. In one example, the signal NEXT may be an incremented version of the signal ADDR.

The block 264 may have a first input that may receive the signal CONFIG, a second input that may receive an output of the block 266a, a third input that may receive an output of the block 266b and a fourth and fifth input that may receive an output from the block 266n. In one example, the first input may be a control input. The block 264 may have an output that may present a signal (e.g., CROSS). The signal CROSS may be configured to indicate detection of a page crossing.

The block 266a may have a first input that may receive a signal (e.g., ADDR[11]) and a second input that may receive a signal (e.g., NEXT[11]). In one example, the block 266a may be configured to assert an output in response to the signal ADDR[11] not equaling the signal NEXT[11]. The block 266b may have a first input that may receive a signal (e.g., ADDR[10]) and a second input that may receive a signal (e.g., NEXT[10]). In one example, the block 266b may be configured to assert an output in response to the signal ADDR[10] not equaling the signal NEXT[10]. The block 266n may have a first input that may receive a signal (e.g., ADDR[9]) and a second input that may receive a signal (e.g., NEXT[9]). In one example, the block 266n may be configured to assert an output in response to the signal ADDR[9] not equaling the signal NEXT[9].

Figure 12:
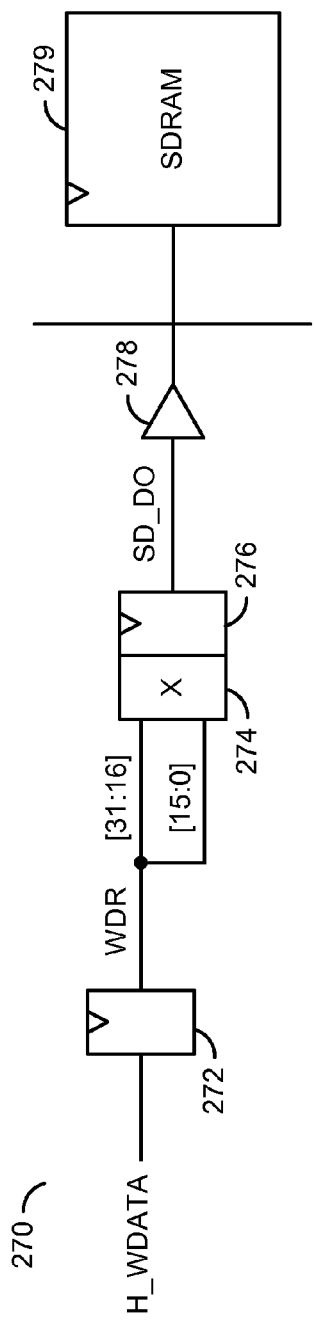
FIG. 12 is a block diagram illustrating a write data path of the memory controller of FIG. 2.

Referring to FIG. 12, a block diagram is shown illustrating a write data path 270 of the memory controller 102. The write data path 270 may comprise a block 272, a block 274, a block 276 and a block 278. The block 272 may be implemented as a write data register. The block 274 may be implemented as a multiplexer. In one example, the block 274 may comprise a 2:1 multiplexer. The block 276 may be implemented as a data out register. The block 278 may be implemented as an output driver. The block 278 may be configured to drive a signal path connected to a memory device 279 located externally to the memory controller 102.

In one example, the memory controller 102 may be configured to communicate data received from an Advanced High-performance Bus (AHB) to a synchronous dynamic random access memory (SDRAM). A write data signal (e.g., H_WDATA) may be captured (or latched) into the register 272. The register 272 may present a signal (e.g., WDR) containing the latched write data at the end of each transfer. In one example, the signals H_WDATA and WDR may be implemented as 32-bit data signals. A lower 16-bit portion of the signal WDR may be presented to a first input of the multiplexer 274. An upper 16-bit portion of the signal WDR may be presented to a second input of the multiplexer 274. The multiplexer 274 may be configured to select the low or high 16-bits of the latched data WDR. The data out register 276 may be configured to latch the bits selected by the multiplexer 274 for presentation as an output data signal (e.g., SD_DO). The register 276 may allow a full clock cycle for driving the output data signal SD_DO. The full clock cycle generally allows for driving the signal SD_DO off-chip, across printed circuit board wiring, and/or taking into account any chip to chip clock skew.

Figure 13:
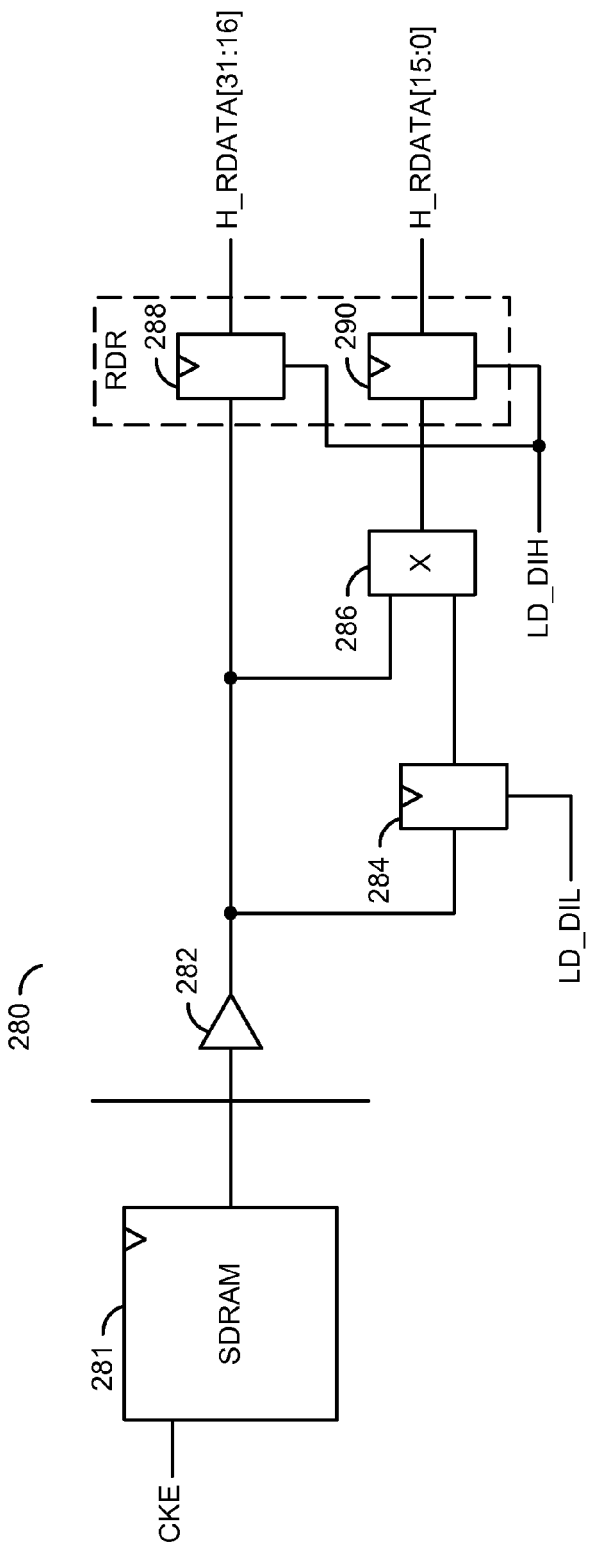
FIG. 13 is a block diagram illustrating a read data path of the memory controller of FIG. 2.

Referring to FIG. 13, a block diagram is shown illustrating a read data path 280 of the memory controller 102 in accordance with the present invention. The read data path 280 may be configured to connect an externally located memory device 281 to the memory controller 102. The read data path 280 may comprise a block (or circuit) 282, a block (or circuit) 284, a block (or circuit) 286, a block (or circuit) 288 and a block (or circuit) 290. The block 282 may be implemented, in one example, as an input buffer. The block 284 may be implemented, in one example, as a register. In one example, the block 284 may comprise a data-in-low register. The block 286 may be implemented, in one example, as a multiplexer. The block 288 may be implemented, in one example, as a register. The block 290 may be implemented, in one example, as a register. In one example, the registers 288 and 290 may operate together as a read data register (RDR).

In one example, a signal received from the external SDRAM 281 may be presented to an input of the block 282. Although the SDRAM 279 and 281 are illustrated as separate devices, the SDRAM 279 and 281 may be implemented as a single device. An output of the block 282 may be presented to a first input of the block 284, a first input of the block 286 and a first input of the block 288. A second input of the block 284 may receive a signal (e.g., LD_DIL). The signal LD_DIL may be implemented as a control signal. An output of the block 284 may be presented to a second input of the block 286. An output of the block 286 may be presented to a first input of the block 290. A signal (e.g., LD_DIH) may be presented to a second input of the block 288 and a second input of the block 290. The signal LD_DIH may be implemented as a control signal. An output of the block 288 may present a signal (e.g., H_RDATA[31:16]). An output of the block 290 may present a signal (e.g., H_RDATA[15:0]). The signal LD_DIH may be configured to load a high portion (e.g., bits 31:16) of data into a register. The signal LD_DIL may be configured to load a low portion (e.g., bits 15:0) of data into a register. The signal H_RDATA may represent an AHB read data bus.

In general, data received from the SDRAM 281 is loaded into the register 284. Next, data received from the SDRAM 281 is loaded into the register 288. Simultaneously, data from the register 284 is loaded into the register 290. The registers 288 and 290 may be configured to directly drive an AHB read data signal (e.g., H_RDATA). The multiplexer 286 generally provides a path for reading 16-bit data from non-SDRAM devices directly to the register 290.

In yet another example of the present invention, the memory controller 102 may include logic for handling AHB busy transfers. "BUSY" transfers are perhaps the most difficult feature of AHB. As stated in the AMBA (on-chip bus) Specification, "The BUSY transfer type allows bus masters to insert IDLE cycles in the middle of bursts of transfers." The BUSY cycles generally disrupt the smooth flow of data bursts through an SDRAM controller. The conventional way of dealing with data flow disruptions is to provide queues or buffers to allow for a mismatch between incoming and outgoing data.

The memory controller 102 implemented in accordance with the present invention may handle AHB BUSY transfers without adding any queues or buffers. For example, the memory controller 102 may be configured to use a clock enable input (e.g., CKE) of the SDRAM 281 to temporarily suspend flow of data through the SDRAM 281. Write BUSY cycles may be handled differently. However, in one example, write BUSY cycles may also use the clock enable input CKE.

Figure 14:
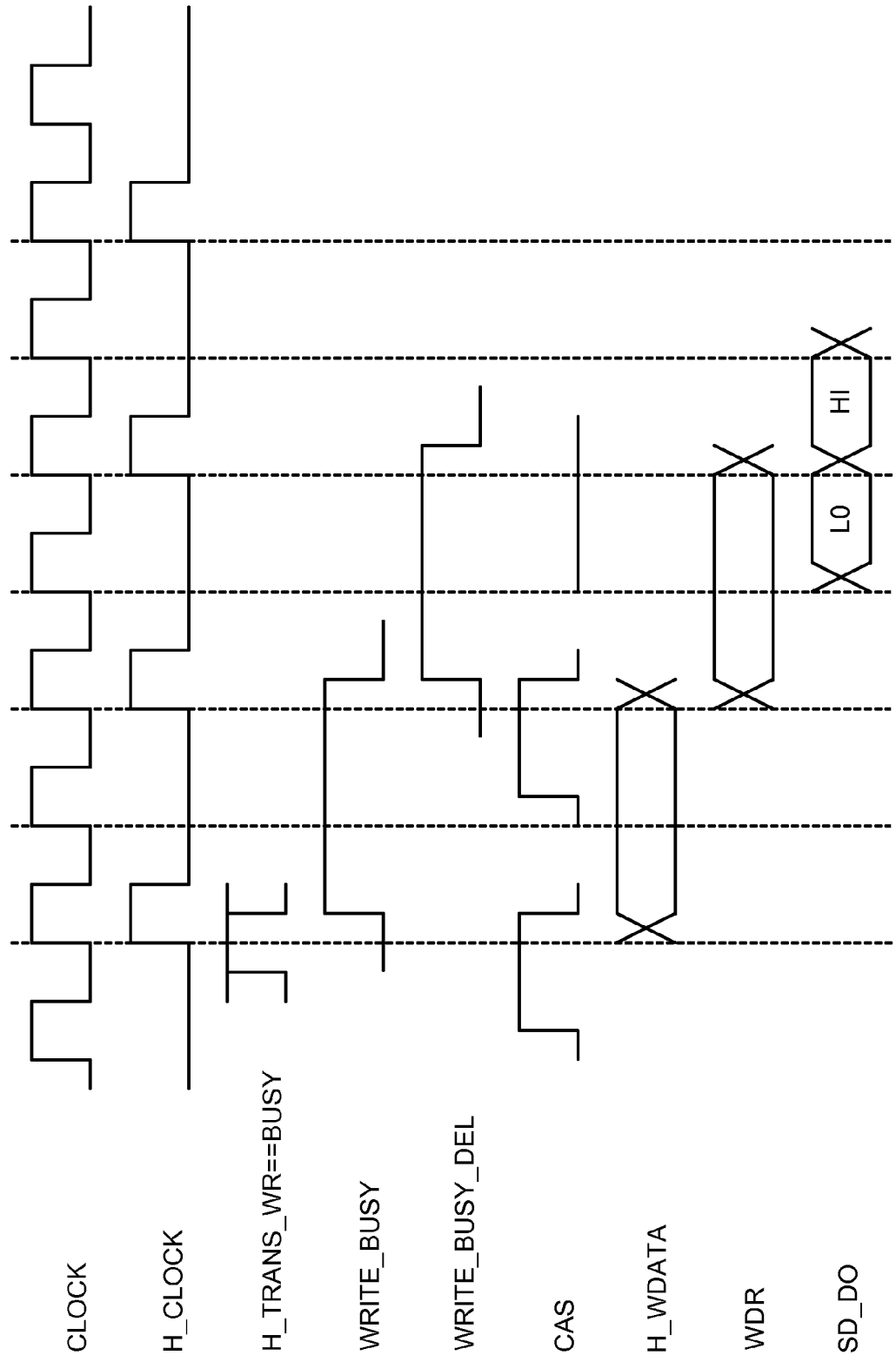
FIG. 14 is a timing diagram illustrating an example of write busy timing.
Figure 15:
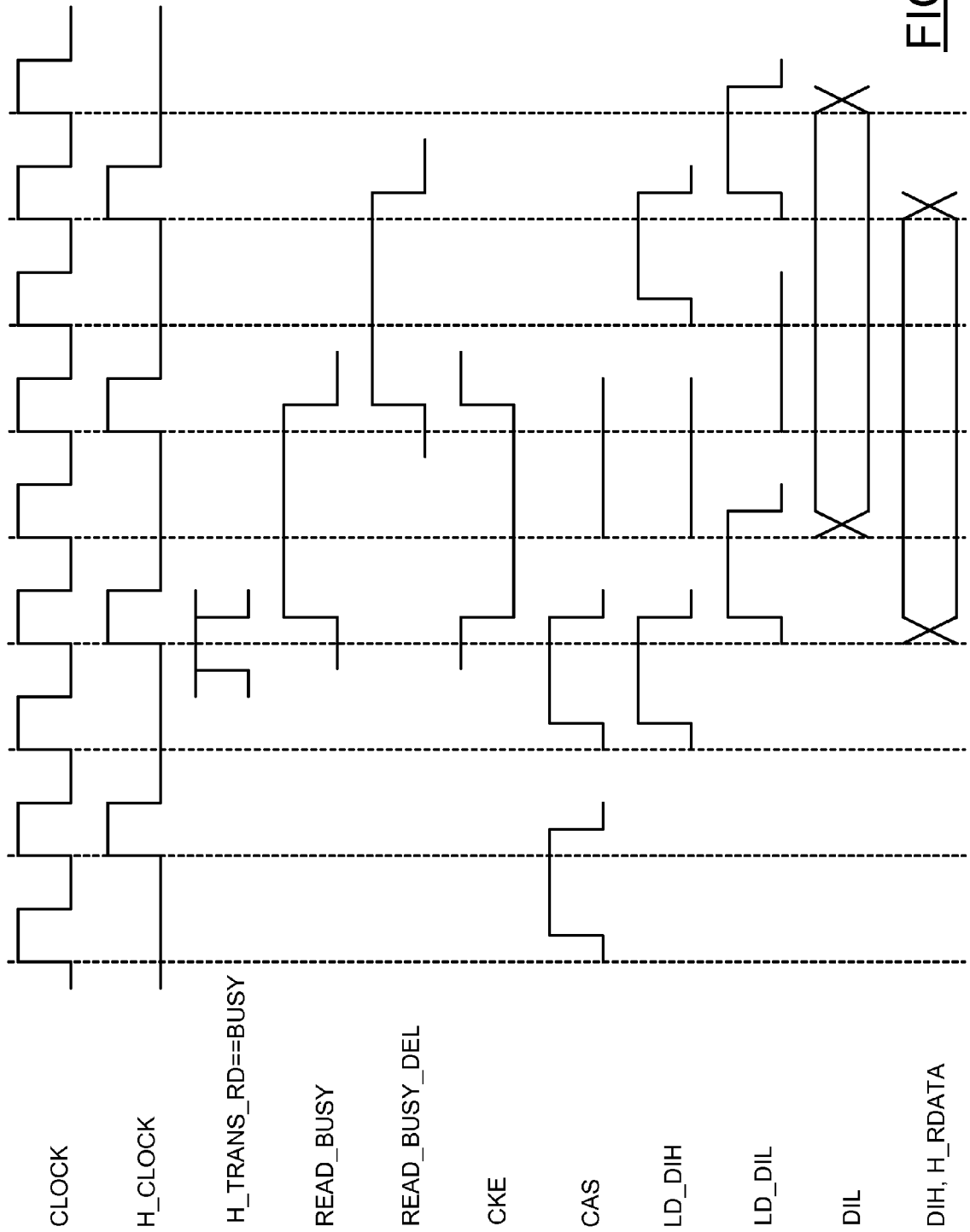
FIG. 15 is a timing diagram illustrating read busy timing.

Referring to FIGS. 14 and 15, timing diagrams are shown illustrating examples of write busy timing (FIG. 14) and read busy timing (FIG. 15). According to some embodiments of the present invention, the SDRAM 279 or 281 may be 16-bits wide and the AHB data may be 32-bits wide. The AHB clock (e.g., H_CLOCK) may run at half the speed of a clock of the SDRAM 279 or 281 and the memory controller 102. The high SDRAM speed may use a CAS (column address strobe) latency of 3 cycles. Details of SDRAM timing are not shown in the timing diagrams for brevity. However, SDRAM timing for a CAS latency of 3 may be found in any SDRAM data sheet. In one example, the SDRAM 279 or 281 may be configured for a burst length of 2 so that two 16-bit words may be transferred for each CAS. CAS is generally aligned with the second half of each H_CLOCK to match SDRAM data timing to AHB data timing.

Referring to FIG. 14, a timing diagram is shown illustrating write busy timing for the write data path 270 of FIG. 12. After the write transfer type signal (e.g., H_TRANS_WR) indicates a BUSY transaction, a flip-flop output may be set to indicate a write-busy cycle (e.g., the signal WRITE_BUSY). A second flip-flop may be used to delay the signal WRITE_BUSY by one H_CLOCK cycle generating the signal WRITE_BUSY_DEL. The signal WRITE_BUSY_DEL inhibits CAS so that data is not written to the SDRAM for the Write BUSY transfer.

Referring to FIG. 15, a timing diagram is shown illustrating example read busy timing for the read data path 280 of FIG. 13. After a read transfer type signal (e.g., H_TRANS_RD) indicates a BUSY transfer, a flip-flop output may be set to indicate a read-busy cycle. Simultaneously, an enable signal (e.g., CKE) may be driven LOW (e.g., a logic 0) to temporarily suspend flow of read data through the SDRAM 281. The signal READ_BUSY generally inhibits CAS (even though this is not necessary because CKE is low). The signal READ_BUSY may also be used to inhibit state changes of flip-flops inside the memory controller 102 (not shown) so that the memory controller 102 maintains synchronization with the SDRAM 281. The signal READ_BUSY may inhibit the signal LD_DIH that controls loading of the registers 288 and 290 such that read data is stretched out. The signal READ_BUSY_DEL, which is a version of the signal READ_BUSY delayed one H_CLOCK cycle, may inhibit the signal LD_DIL, which controls loading of the register 284, to stretch out the read data in the register 284 until the read data is to be loaded into the register 288 and 290.

Figure 16:
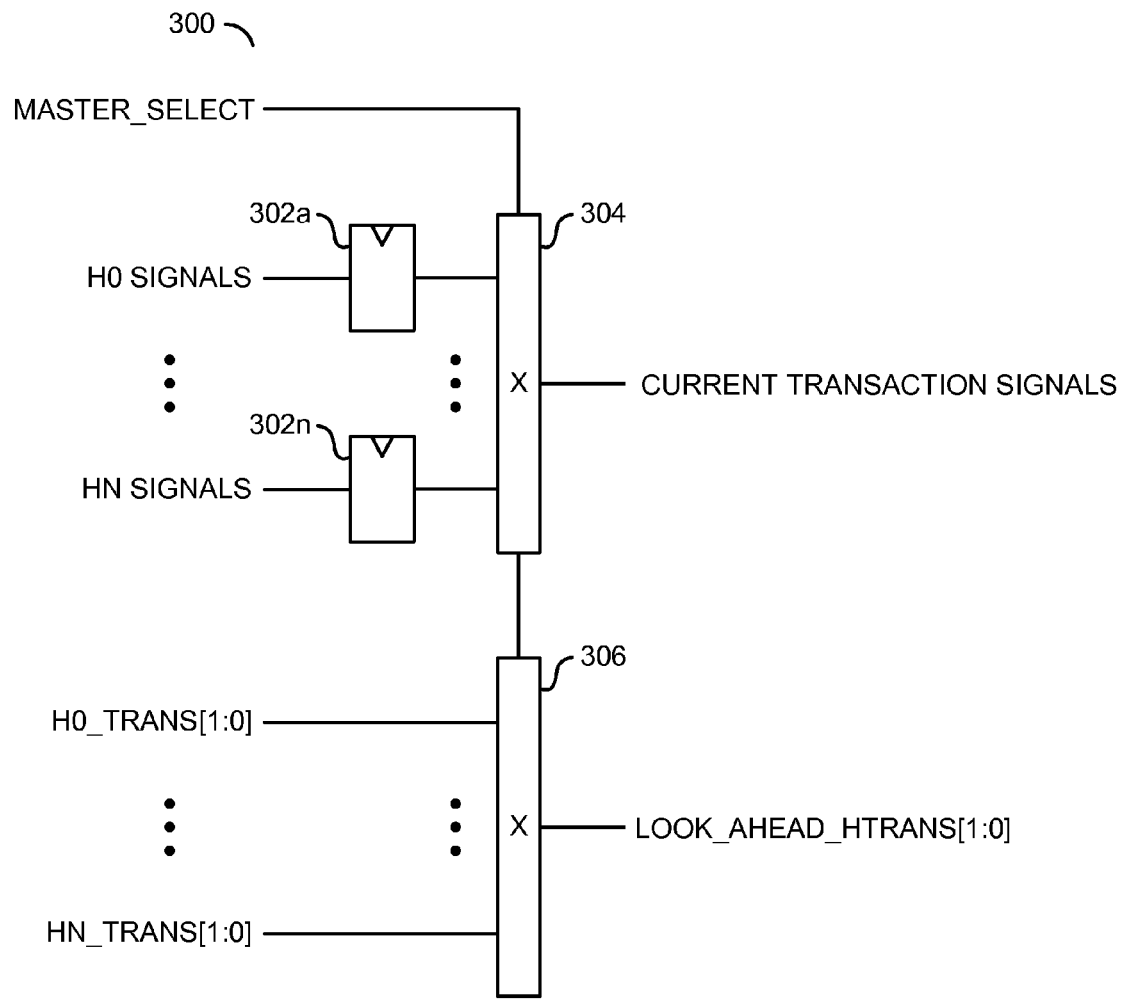
FIG. 16 is a block diagram illustrating a look-ahead logic.

Referring to FIG. 16, a block diagram is shown illustrating a look ahead logic 300. The present invention generally improves the handling of bursts that are terminated early by adding the logic 300 to look ahead at a next transaction. An early burst termination may be detected on the last transfer of the current burst instead of on the first transfer of the next burst. In one example, the look ahead logic 300 may comprise a number of blocks 302a-302n, a block 304 and a block 306. In one example, the blocks 302a-302n may be implemented as registers. The block 304 may be implemented, in one example, as a multiplexer circuit. The block 306 may be implemented, in one example, as a multiplexer circuit.

Each of the blocks 302a-302n may have an input that may receive a set of respective transaction signals (e.g., H0, ..., HN), each from a respective port. An output of each of the blocks 302a-302n may be presented to a respective input of the block 304. The block 304 may have a control input that may receive a signal (e.g., MASTER_SELECT). An output of the block 304 may present a number of current transaction signals selected from the signals H0, ..., HN in response to the signal MASTER_SELECT. The block 306 may have a number of inputs that may receive a number of signals (e.g., H0_TRANS[1:0], ..., HN_TRANS[1:0]), each from a respective port. The block 306 may have a control input that may receive the signal MASTER_SELECT. The circuit 306 may have an output that may present a signal (e.g., LOOK_AHEAD_HTRANS[1:0]). The block 306 may be configured to present one of the signals H0_TRANS[1:0], ..., HN_TRANS[1:0] as the signal LOOK_AHEAD_HTRANS[1:0] in response to the signal MASTER_SELECT.

The look ahead logic 300 may be implemented as part of the memory controller 102 for efficient handling of early burst termination. One feature of AHB is early burst termination. An AHB burst may terminate unexpectedly. The unexpected termination is detected when a transfer type signal (e.g., HTRANS[1:0]) has a value of either NONSEQUENTIAL or IDLE (e.g., indicating the start of a new transaction) instead of an expected value of SEQUENTIAL (e.g., indicating the next transfer of a burst). Early burst termination is quite inefficient for SDRAM read burst transactions. For burst reads in conventional systems, reads are requested ahead of time. When the burst is terminated early, all the requested reads are discarded.

During operation, all input signals to the memory controller 102 are generally registered. Arbitration logic 204 or 234 may be implemented to determine which of N input ports to service next. A wide N to 1 multiplexer 304 may select the input signals for the port chosen by the arbitration logic. The look ahead logic 300 generally adds a 2-bit wide N to 1 multiplexer 306 for multiplexing the input signals H0_TRANS[1:0], HN_TRANS[1:0] from before the input registers 302. The look ahead logic 300 generally provides the signal LOOK_AHEAD_HTRANS[1:0] for the next transfer in parallel with signals for the current transaction (e.g., CURRENT TRANSACTION SIGNALS). An early burst termination is detected on the last transfer of the burst instead of on the first transfer of the next transaction by checking for NONSEQUENTIAL or IDLE values in the signal LOOK_AHEAD_HTRANS[1:0].

The present invention may provide for adding a specified length burst extension to Advanced High Performance Bus (AHB), and AHB protocols. One objective of recent bus designs is to allow bus masters to perform burst transfers of arbitrary length. An Advanced High Performance Bus (AHB) supports arbitrary length bursts using burst type INCR ("Incrementing burst of unspecified length"). However, the unspecified length burst is quite inefficient when used with standard SDRAM; especially for short bursts. The problem is the 3 cycle column access strobe (CAS) latency of the SDRAM plus 1 cycle for registering the data to drive the bus. (2 cycles for the case where the AHB clock is half the speed of the SDRAM or DDR).

An efficient burst read uses addresses provided in advance. However, when the burst length is unspecified, the SDRAM controller may not determine the end address in advance. The SDRAM controller then reads well ahead and discards the extra reads in progress when HTRANS[1:0]=NONSEQUENTIAL or IDLE, which indicates the start of the transaction following the burst, is detected.

The present invention may extend the AHB bus with "sideband" signals in a way that is fully compatible with masters and slaves without the extension. For example, a master with the extension in accordance with the present invention may control a slave without the extension. A slave with the extension may be controlled by a master without the extension. When both master and slave support the extension, arbitrary length bursts may be handled with greater efficiency.

The following input signals may be added to slave ports that support the extension in accordance with the present invention:

HN_BURST_LEN[4:0] 5-bit burst length for port "N" specifies length of burst from 1 to 31, HN_BURST_LEN_ENB Burst length enable for port "N"; tied to 1 to enable HN_BURST_LEN[4:0], tied to 0 to disable HN_BURST_LEN[4:0]; Masters that support the extension provide output signals HN_BURST_LEN[4:0].

The signals may be used to transparently extend the AHB unspecified length burst protocol as follows: The protocol is similar to the AHB unspecified length burst protocol indicated by AHB burst type INCR (HBURST[2:0]=001) with the actual burst length specified by the HN_BURST_LEN[4:0] "sideband" signals.

Figure 18:
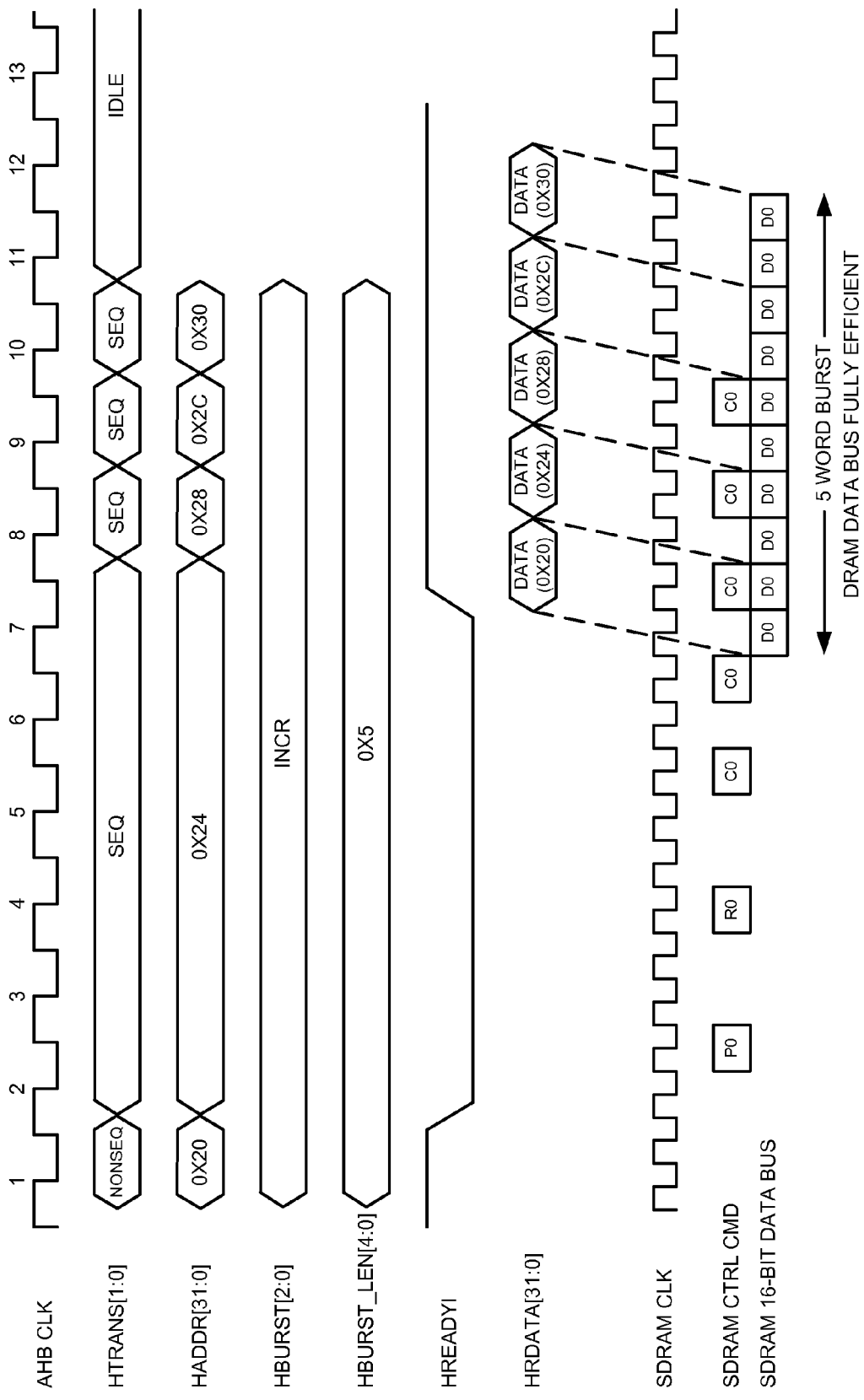
FIG. 18 is a timing diagram illustrating an arbitrary length burst.

Two variations of specified length burst may be implemented: a static length variation and a dynamic length variation. In the static length variation, the signal HN_BURST_LEN[4:0] may be constant for the entire burst. An example illustrating the static length variation is shown in FIG. 18, where the signal HBURST_LEN[4:0] corresponds to the signal HN_BURST_LEN[4:0]. In the dynamic length variation, the signal HN_BURST_LEN[4:0] may decrement so that the signal HN_BURST_LEN[4:0] always indicates the number of transfers remaining. The two variants may have different advantages and disadvantages. In general, the static variant may be easier for masters and the dynamic variant may be easier for slaves. In one example, the static variant may be best in typical systems because a typical system is likely to have multiple masters but perhaps only a single slave such as an SDRAM controller that supports specified length bursts.

The present invention may provide a non-sequential burst extension to AHB and AHB Protocols. Conventional AHB buses can not efficiently support the non-sequential bursts of data used in drawing small triangles. The AHB does not readily support page mode. The present invention generally extends the AHB bus and protocols with a non-sequential burst that may allow a high performance graphics engine to transmit non-sequential bursts of data to a page mode SDRAM controller. One application of the AHB bus is to support high performance graphics rendering to SDRAM. The high performance graphics engine draws many small triangles one pixel at a time. The graphics data has a special property in that the data is highly localized in two dimensions, but not well localized in one dimension. SDRAM can handle the address pattern by reordering address bits so that SDRAM pages are 2-dimensional "tiles" instead of sequential addresses. Most of the time, all the pixels of a small triangle will fall in the same SDRAM page. Some triangles will fall on tile boundaries and be split across two SDRAM pages. A few triangles will fall on tile corners and be split across four SDRAM pages.

The present invention may extend the AHB bus with a "sideband" signal in a way that is fully compatible with masters and slaves without the extension. For example, a master with the extension may control a slave without the extension and a slave with the extension may be controlled by a master without the extension. When both master and slave support the extension, non-sequential bursts may be handled with greater efficiency.

The present invention generally adds an input signal (e.g., NONSEQBURST) to slave ports that support the extension. The signal NONSEQBURST generally signals a non-sequential burst. In one example, the signal NONSEQBURST may be held at 0 when the extension is not supported by the master. Masters that support the extension may be configured to provide the output signal NONSEQBURST.

Figure 19:
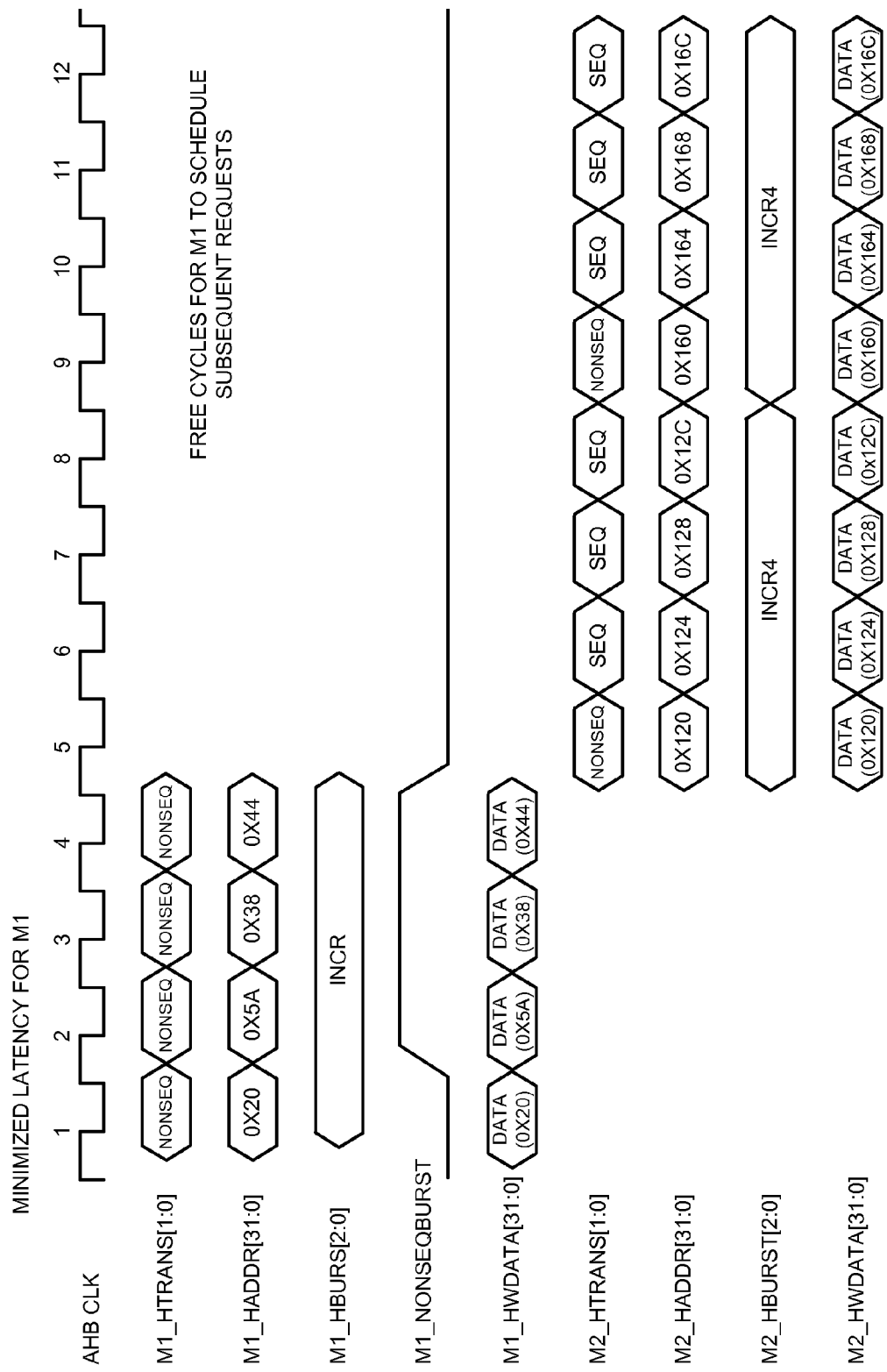
FIG. 19 is a timing diagram illustrating a non-sequential burst.

Referring to FIG. 19, a timing diagram is shown illustrating a non-sequential burst protocol in accordance with the present invention. The non-sequential burst protocol is defined so that the transactions are fully consistent with AHB protocols if the signal NONSEQBURST is ignored. The first write of a Non-sequential burst should be a nonsequential transaction (HTRANS=10) with NONSEQBURST=0 and unspecified length burst (HBURST=001). Single transfers may be performed using an unspecified-length incrementing burst which only has a burst length of one. Subsequent writes of a Non-sequential burst should be nonsequential transactions (HTRANS=10) with NONSEQBURST=1 and unspecified length burst (HBURST=001).

Non-sequential bursts may be defined so the memory controller 102 may handle sequential bursts and non-sequential bursts the same way: simply stream column address and write data to the SDRAM. Bus arbitration logic either external or internal to the memory controller 102 should treat a non-sequential burst like a sequential burst and not rearbitrate in the middle. In order to improve efficiency and simplify the memory controller 102, non-sequential burst capable bus masters may be responsible for guaranteeing that the individual writes that compose a non-sequential burst are in the same SDRAM page.

As used herein, the term "simultaneously" is meant to describe events that share some common time period but the term is not meant to be limited to events that begin at the same point in time, end at the same point in time, or have the same duration.

As would be apparent to those skilled in the relevant art(s), the signals illustrated in FIG. 1 represent logical data flows. The logical data flows are generally representative of physical data transferred between the respective blocks by, for example, address, data, and control signals and/or busses. The system represented by the circuit 100 may be implemented in hardware, software or a combination of hardware and software according to the teachings of the present disclosure, as would be apparent to those skilled in the relevant art(s).

The function(s) illustrated by the diagrams of FIGS. 1-19 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

What is claimed is:

1. A memory controller comprising:
a page crossing detect logic including an address incrementer configured to generate a next address in a current burst from a current address in the current burst, wherein said page crossing detect logic is configured to generate a signal indicating whether the current burst will cross a memory page boundary based on the current address and the next address;
a lookahead logic configured to detect an early burst termination on the last transfer of the current burst, wherein said look ahead logic is configured to receive one or more transaction signals and one or more transfer type signals from each of a plurality of ports, latch the one or more transaction signals from each of the plurality of ports, multiplex the latched transaction signals in response to a control signal, and multiplex the one or more transfer type signals received from the plurality of ports in response to the control signal; and
one or more slave ports configured to provide a first sideband signal configured to specify a burst length for a respective port and a second sideband signal configured to enable the first sideband signal in a first state and disable the first sideband signal in a second state, wherein the memory controller is configured to artificially terminate bursts crossing page boundaries and handle the artificially terminated bursts as bursts that terminated early.

2. The memory controller according to claim 1, wherein the page crossing detect logic is configured to support a plurality of dynamic random access memory (DRAM) configurations.

3. The memory controller according to claim 2, wherein the page crossing detect logic comprises a multiplexer configured to select one of a plurality of crossing detectors based on a configuration of the memory controller.

4. The memory controller according to claim 3, wherein said multiplexer comprises a four-to-one multiplexer.

5. The memory controller according to claim 3, wherein each of the plurality of crossing detectors comprises a comparator configured to compare a bit of the current address with a corresponding bit of the next address.

6. A method for providing efficient early burst termination comprising the steps of:
receiving one or more transaction signals and one or more transfer type signals from each of a plurality of ports;
latching the one or more transaction signals from each of the plurality of ports;
multiplexing the latched transaction signals in response to a control signal;
multiplexing the one or more transfer type signals received from the plurality of ports in response to the control signal;
generating a next address in a burst from a current address in the burst;
generating a signal indicating whether the burst will cross a memory page boundary based on the current address and the next address and automatically splitting the burst when the page boundary will be crossed;
providing a first sideband signal configured to specify a burst length for a respective port; and
providing a second sideband signal configured to enable the first sideband signal in a first state and disable the first sideband signal in a second state.

7. The method according to claim 6, further comprising the step of detecting an early burst termination on a last transfer of a current burst.

8. The method according to claim 7, wherein detection of the early burst termination comprises looking ahead at a next transaction.

9. The method according to claim 7, wherein detection of the early burst termination comprises detecting when said one or more transfer type signals has an unexpected value.

10. The method according to claim 7, wherein detection of the early burst termination comprises detecting when said one or more transfer type signals has a value indicating a start of a new transaction.

11. The method according to claim 7, further comprising discarding all requested reads when the burst is terminated early.

12. The method according to claim 6, wherein the control signal comprises a master select signal.

13. The method according to claim 6, wherein a value of the first sideband signal is held constant for an entire burst.

14. The method according to claim 6, wherein a value of the first sideband signal is decremented to indicate how many transfers are remaining in a burst.

15. The method according to claim 6, further providing a nonsequential burst extension comprising the steps of:
   generating a transaction type signal at a master device;
   generating the first sideband signal specifying the burst length at the master device; and
   generating a third sideband signal at the master device, wherein the third sideband signal signals a nonsequential burst transfer.

16. The method according to claim 15, further comprising the steps of:
   performing a first write of a nonsequential burst with (i) the third sideband signal in an unasserted state, (ii) the transaction type signal indicating a nonsequential transaction and (iii) the first sideband signal indicating an unspecified length burst; and
   performing subsequent writes of the nonsequential burst with (i) the third sideband signal in an asserted state, (ii) the transaction type signal indicating a nonsequential transaction and (iii) the first sideband signal indicating an unspecified length burst.

17. The method according to claim 15, wherein the first sideband signal is constant for the entire burst.

18. The method according to claim 15, wherein the first sideband signal is configured to indicate dynamic length variation of the burst.

19. The method according to claim 15, wherein the first sideband signal indicates the number of transfers remaining.

20. The method according to claim 6, further comprising the steps of:
   artificially terminating a burst crossing a page boundary;
   maintaining the artificially terminated burst as active on an input port of a memory controller; and
   handling the artificially terminated burst as a burst that terminated early.

\* \* \* \* \*